(12) United States Patent  
Batt et al.

(10) Patent No.: US 9,290,882 B2
(45) Date of Patent: Mar. 22, 2016

(54) SPEED DEPENDENT CLUTCH

(75) Inventors: Geoffrey Paul Batt, Pokeno (NZ); Sophie Elizabeth Lane, Christchurch (NZ); David Charles Rhodes, Auckland (NZ); Ian Campbell McGill, Auckland (NZ)

(73) Assignee: Fisher & Paykel Appliances Limited, Auckland (NZ)

( * ) Notice: Subject to any disclaimer, the term of this patent is extended or adjusted under 35 U.S.C. 154(b) by 465 days.

(21) Appl. No.: 13/392,207

(22) PCT Filed: Aug. 25, 2010

(86) PCT No.: PCT/NZ2010/000166
§ 371 (c)(1),
(2), (4) Date: May 29, 2012

(87) PCT Pub. No.: WO2011/025391
PCT Pub. Date: Mar. 3, 2011

(65) Prior Publication Data
US 2012/0228079 A1    Sep. 13, 2012

Related U.S. Application Data

(60) Provisional application No. 61/237,021, filed on Aug. 26, 2009.

(51) Int. Cl.
*F16D 41/064* (2006.01)
*D06F 37/40* (2006.01)
(Continued)

(52) U.S. Cl.
CPC ............ *D06F 37/40* (2013.01); *D06F 23/04* (2013.01); *F16D 43/14* (2013.01); *D06F 13/02* (2013.01);
(Continued)

(58) Field of Classification Search
CPC ......... D06F 37/40; F16D 43/14; F16D 43/18; F16D 43/24; F16D 41/064; F16D 2041/0646

USPC .... 192/105 A, 105 BA, 105 BB, 105 R, 53.1, 192/53.4, 53.6, 103 B, 54.52, 74, 84.7, 84.8, 192/103 C, 66.2, 69.5, 105 CE, 51, 105 B
See application file for complete search history.

(56) References Cited

U.S. PATENT DOCUMENTS 558,193 A * 4/1896 Dunham ...................... 292/329
2,081,743 A * 5/1937 Glen ........................ 192/105 B
(Continued)

FOREIGN PATENT DOCUMENTS

| GB | 632703 | 11/1949 |
|---|---|---|
| WO | 2007/114712 | 10/2007 |
| WO | 2008/143528 | 11/2008 |

OTHER PUBLICATIONS

International Search Report of International Application PCT/NZ2010/000166 completed on Oct. 25, 2010 by the Australian Patent Office (3 pages).

(Continued)

*Primary Examiner* — Robert Hodge
*Assistant Examiner* — Ryan Dodd
(74) *Attorney, Agent, or Firm* — Clark Hill PLC

(57) ABSTRACT

The present invention relates to a clutch for a laundry appliance. The clutch selectively connects a laundry vessel to a variable speed drive. A driven member is rotationally coupled to the variable speed drive and a driven member is rotationably coupled to the laundry vessel. The driven member is at least partially rotationally coupled to the driven member by friction. At least one locking element is moveable from an unlocked position to a locking position. The driven member and the driven member are rotationally coupled together once the driven member accelerates to a rotational speed above a first rotational speed, connecting the laundry vessel to the variable speed drive.

21 Claims, 12 Drawing Sheets

(51) Int. Cl.
  *F16D 43/14*   (2006.01)
  *D06F 23/04*   (2006.01)
  *F16D 43/18*   (2006.01)
  *F16D 43/24*   (2006.01)
  *F16D 43/16*   (2006.01)
  *D06F 13/02*   (2006.01)

(52) U.S. Cl.
  CPC .............. *F16D 41/064* (2013.01); *F16D 43/16* (2013.01); *F16D 43/18* (2013.01); *F16D 43/24* (2013.01); *F16D 2041/0646* (2013.01)

(56) References Cited

U.S. PATENT DOCUMENTS

| | | | | |
|---|---|---|---|---|
| 2,346,668 | A | * | 4/1944 | Dunham .......................... 68/23.3 |
| 2,720,300 | A | * | 10/1955 | Muhlbeyer ................. 192/105 R |
| 2,962,127 | A | * | 11/1960 | Luenberger ................ 188/82.84 |
| 3,461,746 | A |   | 8/1969 | Schwerdhofer |
| 3,684,064 | A |   | 8/1972 | Hamilton, III |
| 3,762,519 | A |   | 10/1973 | Bentley |
| 4,106,605 | A |   | 8/1978 | Winchell |
| 4,390,089 | A |   | 6/1983 | Dalrymple |
| 5,279,402 | A |   | 1/1994 | Beigang |
| 5,353,613 | A |   | 10/1994 | Smith et al. |
| 5,558,193 | A | * | 9/1996 | Jenkins et al. ........... 192/45.005 |
| 6,212,722 | B1 |   | 4/2001 | Pinkowski et al. |
| 7,121,391 | B2 |   | 10/2006 | Kuo |
| 2003/0135933 | A1 |   | 7/2003 | Sears |
| 2008/0078643 | A1 |   | 4/2008 | Yetzke |

OTHER PUBLICATIONS

ISA Written Opinion of International Application PCT/NZ2010/000166 completed on Oct. 25, 2010 by the Australian Patent Office (3 pages).

* cited by examiner

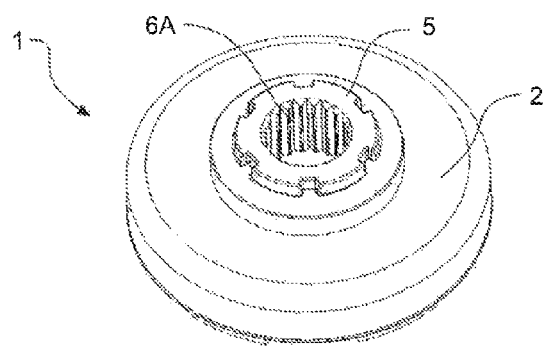
FIGURE 2A
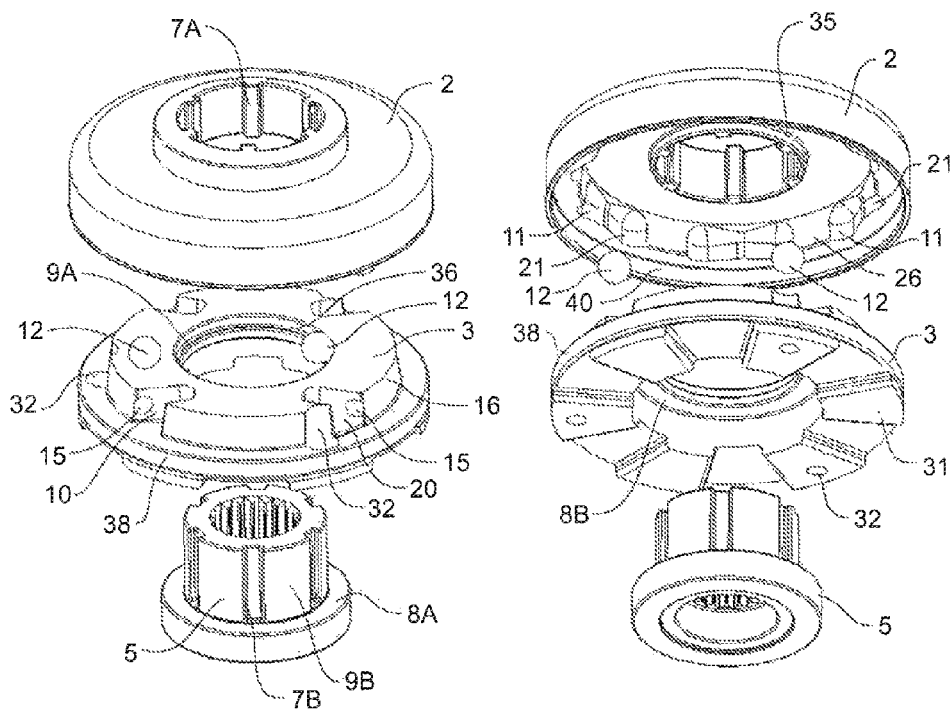
FIGURE 2B  FIGURE 2C

SPEED DEPENDENT CLUTCH

FIELD OF THE INVENTION

The present invention relates to a speed dependent clutch for a laundry appliance.

BACKGROUND TO THE INVENTION

In 1991 Fisher & Paykel Limited released the first model of their SMARTDRIVE washing machines. This machine included a cabinet, a tub suspended within the cabinet by a plurality of suspension rods extending between the top edge of the cabinet and a lower portion on the tub. A single shaft extended through the base of the tub. The stator of a salient pole electronically commutated brushless DC motor was fixed to the lower side of the tub base. An external permanent magnetic rotor was fitted to the lower end of the shaft to substantially surround the stator. Within the tub a spin basket was supported for rotation on the shaft. Within the spin basket an agitator was fixed to the upper end of the shaft. The agitator was of a central post type with three lateral vanes and a generally conical base portion. The spin basket was supported by the shaft at a lower position, and was free to rise on the shaft to an upper position. The spin basket included downwardly facing hollow chambers. Vertical support of the spin basket on the shaft in the lower position included inter-engagement of a downwardly facing castellated clutch on the spin basket and an upwardly facing castellated clutch fixed to the shaft. Accordingly, without sufficient wash liquid in the tub for the spin basket and any associated load to float, the spin basket remained rotationally fixed to the shaft. With sufficient wash liquid in the tub, the float chambers of the spin basket would provide for the basket and load to float and disengage from the shaft, such that the shaft would rotate independently of the spin basket. This arrangement is described in U.S. Pat. No. 5,353,613. This direct drive electronically controlled laundry machine has been very successful. A number of competing companies have sought to devise alternative arrangements for selectively transmitting power of the motor to the spin basket.

U.S. Pat. No. 6,212,722 proposes an improved laundry washing machine for domestic use. This machine is of the top loading type having an outer bowl, a wash basket within the outer bowl and access to the wash basket through a top opening. A motor is provided to drive rotation of the wash basket within the outer bowl. A wash plate is provided in the lower portion of the wash basket to be rotated by the motor with the wash basket or independently of the wash basket. The patent proposes a combination of water level control, wash plate design, wash basket design and movement pattern for the wash plate which leads to an inverse toroidal movement of the laundry load during a wash phase. The sodden wash load is dragged radially inward on the upper surface of the wash plate and progresses upward in the region of the centre. The sodden wash load then progresses radially outward to the wall of the wash basket and downward to the base of the wash basket. This has been found to provide an effective wash action with low water consumption.

When a wash system of the type disclosed in U.S. Pat. No. 6,212,722 is applied to a machine of the type described in U.S. Pat. No. 5,353,613, the water volume required to operate the floating clutch can be a significant factor in overall water consumption.

In order to selectively couple the spin basket to the drive, the applicant has applied lost motion clutch arrangements to uncouple the spin basket for a range of motion. In WO 2007/114712, a laundry machine comprises a lost motion clutch located in the tub. The lost motion clutch interconnects between the drive assembly and the spin basket and absorbs greater than one revolution of relative rotation, to allow the agitator to move independently of the spin basket. In WO 2008/143528, a laundry machine comprises a lost motion clutch engaged between the drive assembly and the spin basket to allow the agitator to move independently of the spin basket. The lost motion clutch absorbs greater than one revolution of relative rotation between the agitator and the spin basket. The amount of uncoupling provided by a lost motion clutch is limited by the range of travel between the end conditions of the clutch.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved clutch for a laundry appliance, or to at least provide the industry with a useful choice.

SUMMARY OF THE INVENTION

In one aspect, the present invention consists in a laundry appliance comprising:
  a tub for holding washing liquid,
  a rotatable wash basket located within the tub,
  an agitator mounted in a lower portion of the wash basket, the agitator rotatable relative to the wash basket,
  a variable speed drive having a drive shaft rotatable by the drive at adjustable selected speeds and in clockwise and counter clockwise rotational directions,
  a clutch for selectively locking the agitator and wash basket for rotation together, the clutch comprising:
  a driving member rotationally coupled to the drive shaft and to the agitator,
  a driven member which is at least partially rotationally coupled by a frictional coupling to the driving member, the driven member also rotationally coupled to the wash basket, and
  at least one locking element which, during rotation of the driving member in the clockwise or counter clockwise rotational direction at a speed which causes the driven member, via the frictional coupling, to rotate below a first rotational speed in the clockwise or counter clockwise rotational direction, is in an unlocked position in which the driving and driven members are able to rotate at different rotational speeds and which moves to a locking position in which the at least one locking element contacts the driven member and the driving member and locks them together so that they rotate at the same rotational speed once the speed of the driving member increases sufficiently in one rotational direction to cause the driven member, via the frictional coupling, to rotate at or above the first rotational speed.

Preferably the driven member has at least one channel extending from an inner radial position to an outer radial position, a said locking element being disposed in a said channel, the locking position being at the outer radial position of the channel.

Preferably the driven member has an outer circumferential surface and the driving member has a inner circumferential surface facing and closely adjacent to said outer circumferential surface, the at least one channel extending from the inner radial position to the outer circumferential surface to be open at the outer circumferential surface, and the at least one pocket being located in the driving member inner circumferential surface.

Preferably the at least one pocket is directional, the pocket having an abutment side and a ramped side, and when the locking element enters a said pocket the locking element rotationally couples the driving and driven sides together when accelerating in a first direction or at a constant speed following acceleration in the first direction, the locking element being captured between the abutment side and a side of the channel facing the abutment side.

Preferably when the locking element enters a said pocket and the driving member is rotating relative to the driven member in a second rotational direction opposite to the first rotational direction, the locking element moves along the ramped surface to be displaced back into the channel thereby preventing rotational coupling between the driving and driven members.

Preferably there are a pair of said channels and a corresponding pair of said locking elements.

Preferably the at least one locking element is spherical.

Preferably the ramped surface is an inclined bottom surface of said channel.

Preferably the pocket has a maximum radial depth approximately equal to the radius of the locking element.

Preferably the clutch further comprises a drive element fixed to the drive shaft, the drive element locating the driven member vertically and radially with respect to the drive shaft, the driven member and drive element adapted to allow the driven member to rotate relative to the drive element, the driving member being rotationally coupled to the drive element to rotationally couple the driving member to the drive shaft.

Preferably the at least one channel is angled to the radial direction of the clutch so that one side of the channel is longer than an opposite side of the channel, the longer side of the channel facing the abutment surface of a corresponding said pocket.

Preferably the channel is angled at approximately 30 degrees to the radial direction of the clutch.

Preferably the longer side of the channel includes a dimple for receiving the locking element when the locking element is captured between the longer side of the channel and the abutment side of a corresponding pocket.

Preferably the dimple is positioned to lift the locking element off the ramped bottom of the channel when the locking element is captured between the longer side of the channel and the abutment side of a corresponding pocket.

Preferably a portion of the longer side of the channel or the abutment side of the pocket or both are shaped to match the locking element.

Preferably the pocket has a ceiling portion angled relative to the ramped surface of the channel so that the height of the pocket decreases in a radial direction outwards so that when the locking element enters the pocket the locking element strikes the ceiling portion to cause a reaction force to act against the locking element at a direction into the ramped surface of the channel.

Preferably the ceiling portion is also inclined in a circumferential direction so that the height of the pocket decreases in a circumferential direction from the abutment surface towards an end of the pocket opposite the abutment surface.

Preferably the ceiling portion extends outside the pocket in a direction towards the centre of the clutch.

Preferably the ceiling portion extends between adjacent pockets in a circumferential direction of the clutch, the height of the ceiling portion between adjacent pockets being constant in the circumferential direction.

Preferably when the at least one first locking element is in the locking position, the first locking element rotationally couples the driven member to the driving member in the first rotational direction during acceleration or constant speed following acceleration, and when the at least one second locking element is in the locking position, the at least one second locking element rotationally couples the driven member to the driving member in the first rotational direction during deceleration or constant speed following deceleration.

Preferably the at least one second locking element moves from the unlocked position to the locking position once the driven member reaches a rotational speed above a second rotational speed, said second rotational speed being higher than said first rotational speed.

Preferably the driving member has at least one first channel extending from an inner radial position to an outer radial position, a said first locking element being disposed in a said first channel, the locking position being at the outer radial position of the channel, the driving member having at least one first pocket, the first channel having a ramped surface, the ramped surface being inclined at a first angle from the inner radial position to the outer radial position to in use gravitationally bias the first locking element to the inner radial position, in use the first locking element moving from the inner radial position to the outer radial position under centrifugal force to enter a said first pocket at the outer radial position when said first pocket is radially aligned with said first channel when speed of the driven member accelerates to a speed above the first rotational speed, and the driven member having at least one second channel extending from an inner radial position to an outer radial position, a said second locking element being disposed in a said second channel, the locking position being at the outer radial position of the channel, the driving member having at least one second pocket, the second channel having a ramped surface, the ramped surface being inclined at a second angle from the inner radial position to the outer radial position to in use gravitationally bias the second locking element to the inner radial position, in use the second locking element moving from the inner radial position to the outer radial position under centrifugal force to enter a said second pocket at the outer radial position when said second pocket is radially aligned with said second channel when speed of the driven member accelerates to a speed above a second rotational speed.

Preferably the second angle is greater than the first angle, the second rotational speed being higher than the first rotational speed.

Preferably the first speed is approximately 60 rpm.

Preferably the second speed is approximately 140 rpm

Preferably when the at least one first locking element is in the outer radial position and the at least one second locking element is in the outer radial position and the driven member and the driving member are accelerating or at constant speed following acceleration in the first rotational direction, said at least one first locking element is captured between said driven member and said driving member to rotational couple said driven member and said driving member together, and said at least one second locking element is not captured between said driven member and said driving member.

Preferably when the clutch speed changes from acceleration or constant speed following acceleration in the first direction to deceleration in the first direction, the at least one first locking element is released from between the driven and drive members and the at least one second locking element is captured between the driven and drive members, and once released the first locking element is free to move to the inner radial position once the rotational speed of the clutch decreases below the first rotational speed.

Preferably there is a small amount of relative movement between the driven menber and the driving member when the at least one first locking element is released from and the at least one second locking element is captured by the driven and driving members.

Preferably the small amount of relative movement between the driven and driving member is approximately 1 degree of relative rotation.

Preferably there are a pair of said first channels and corresponding first locking elements and a pair of said second channels and corresponding second locking elements.

Preferably the at least one first channel and the at least one first pocket are located on a first level, and the at least one second channel and the at least one second pocket are located on a second level, so that the at least one first locking element cannot interface with the at least one second pocket and the at least one second locking element cannot interface with the at least one first pocket.

Preferably when the at least one second locking clement is in the locking position, the at least one second locking element rotationally couples the driven member to the driving member in the second rotational direction during acceleration or constant speed following acceleration, and when the at least one first locking element is in the locking position, the at least one first locking element rotationally couples the driven member to the driving member in the second rotational direction during deceleration or constant speed following deceleration.

Preferably the clutch comprises a bearing surface fixed to the drive shaft for vertically locating the driven member on the drive shaft, the bearing surface slidingly supporting a corresponding surface of the driven member, and friction there between causing partial rotational coupling between the driven member and the driving member.

Preferably the clutch includes an inner circumferential seal and an outer circumferential seal for keeping washing fluid out of the inside of the clutch.

Preferably the laundry appliance includes a bell housing the clutch to enclose the clutch in an air trap to prevent washing fluid from entering the clutch.

In a second aspect, the present invention consists in a clutch for a laundry appliance comprising:

a driving member and a driven member, in use the driving member being rotationally coupled to a drive comprising a drive shaft, the driving member and driven member at least partially rotationally coupled by a frictional coupling, locking elements in one of the driving member or the driven member, the locking elements comprising:

at least one first locking element moveable from an unlocked position to a locking position once said one of the driving member or the driven member accelerates to a rotational speed above a first rotational speed, and at least one second locking element moveable from an unlocked position to a locking position once said one of the driving member or the driven member accelerates to a rotational speed above a second rotational speed, the driven member adapted to rotate relative to the driving member and drive shaft when the first and second locking elements are in their unlock positions, and the at least one first locking element, during rotation in a first rotational direction, rotationally locking the driven member and the driving member together during acceleration or constant speed following acceleration of the driving member when the at least one first locking element is in the locking position, the at least one first locking element being captured between the driving member and the driven member, and the at least one second locking element, during rotation in the first rotational direction, rotationally coupling the driven member and the driving member together during deceleration or constant speed following deceleration of the driving member when the at least one second locking element is in the locking position, deceleration of the driving member in the first rotational direction resulting in relative rotation between the driving member and driven member which, while the speed of said one of the driving member or the driven member is above the second rotational speed, allows the at least one first locking element to be released from being captured between the driving member and the driven member and allows the at least one second locking element to be captured between the driving member and the driven member.

Preferably the first rotational speed is lower than the second rotational speed.

Preferably in use the driven member is at least partially rotationally coupled to the driving member by friction, and the at least one first locking element being moveable from the unlocked position to the locking position once the driven member accelerates to a rotational speed above the first rotational speed.

Preferably in use the driven member is at least partially rotationally coupled to the driving member by friction, and the at least one second locking element being moveable from the unlocked position to the locking position once the driven member accelerates to a rotational speed above the second rotational speed.

Preferably the driven member having at least one first channel extending from an inner radial position to an outer radial position, a said first locking element being disposed in a said first channel, the locking position being at the outer radial position of the channel, the driving member having at least one first pocket, the first channel having a ramped surface, the ramped surface being inclined at a first angle from the inner radial position to the outer radial position to in use gravitationally bias the first locking element to the inner radial position, in use the first locking element moving from the inner radial position to the outer radial position under centrifugal force to enter a said first pocket at the outer radial position when said first pocket is radially aligned with said first channel when speed of the driven member accelerates to a speed above the first rotational speed, and the driven member having at least one second channel extending from an inner radial position to an outer radial position, a said second locking element being disposed in a said second channel, the locking position being at the outer radial position of the channel, the driving member having at least one second pocket, the second channel having a ramped surface, the ramped surface being inclined at a second angle from the inner radial position to the outer radial position to in use gravitationally bias the second locking element to the inner radial position, in use the second locking element moving from the inner radial position to the outer radial position under centrifugal force to enter a said second pocket at the outer radial position when said second pocket is radially aligned with said second channel when speed of the driven member accelerates to a speed above a second rotational speed.

Preferably the second angle is greater than the first angle, the second rotational speed being higher than the first rotational speed.

Preferably the first speed is approximately 60 rpm.

Preferably the second speed is approximately 140 rpm.

Preferably the driven member has an outer circumferential surface and the driving member has a inner circumferential surface facing and closely adjacent to said outer circumferential surface, the at least one first channel extending from the inner radial position to the outer circumferential surface to be open at the outer circumferential surface, and the at least one first pocket being located in the driving member inner circumferential surface, and the at least one second channel extending from the inner radial position to the outer circumferential surface to be open at the outer circumferential surface, and the at least one second pocket being located in the driving member inner circumferential surface.

Preferably the at least one first pocket is directional having an abutment side and a ramped side, and when the first locking element enters a said first pocket the first locking element rotationally couples the driving and driven sides together when accelerating in the first rotational direction or at a constant speed following acceleration in the first rotational direction, the first locking element being captured between the abutment side of the first pocket and a side of the first channel facing the abutment side, and the at least one second pocket is directional having an abutment side and a ramped side, and when the second locking element enters a said second pocket the second locking element rotationally couples the driving and driven sides together when decelerating in the first rotational direction or at a constant speed following deceleration in the first rotational direction, the second locking element being captured between the abutment side of the second pocket and a side of the second channel facing the abutment side.

Preferably the at least one first locking element and the at least one second locking element are spherical.

Preferably the ramped surface of the at least one first channel is an inclined bottom surface of said first channel, and the ramped surface of the at least one second channel is an inclined bottom surface of said second channel.

Preferably the first pocket has a maximum radial depth approximately equal to the radius of the first locking element and the second pocket has a maximum radial depth approximately equal to the radius of the second locking element Preferably the clutch further comprises a drive element fixed to the drive shaft, the drive element locating the driven member vertically and radially with respect to the drive shaft, the driven member and drive element adapted to allow the driven member to rotate relative to the drive element, the driving member being rotationally coupled to the drive element to rotationally couple the driving member to the drive shaft.

Preferably the at least one first channel is angled to the radial direction of the clutch so that one side of the first channel is longer than an opposite side of the first channel, the longer side of the first channel facing the abutment surface of a corresponding said first pocket, and the at least one second channel is angled to the radial direction of the clutch so that one side of the second channel is longer than an opposite side of the second channel, the longer side of the second channel facing the abutment surface of a corresponding said second pocket.

Preferably the longer side of the first channel includes a dimple for receiving the first locking element when the first locking element is captured between the longer side of the first channel and the abutment side of a corresponding first pocket, and the longer side of the second channel includes a dimple for receiving the second locking element when the second locking element is captured between the longer side of the second channel and the abutment side of a corresponding second pocket.

Preferably the dimples in the longer sides of the first and second channels are positioned to lift the first and second locking elements off the ramped bottom of the first and second channels when the first and second locking elements are captured between the longer side of the first and second channel and the abutment side of a corresponding first and second pocket.

Preferably the first and second pockets each have a ceiling portion angled relative to the ramped surface of the first and second channels so that the height of the first and second pockets decreases in a radial direction outwards so that when the first and second locking elements enter the first and second pockets the first and second locking elements strike the ceiling portions to cause a reaction force to act against the first and second locking elements at a direction into the ramped surfaces of the first and second channels.

Preferably the ceiling portions of the first and second pockets are also inclined in a circumferential direction so that the height of the first and second pockets decreases in a circumferential direction from the abutment surface of the first and second pocket towards an end of the first and second pockets opposite the abutment surface.

Preferably the ceiling portion of the first and second pockets extends outside the first and second pockets in a direction towards the centre of the clutch.

Preferably the at least one first locking element is in the outer radial position and the at least one second locking element is in the outer radial position and the driven member and the driving member are accelerating or at constant speed following acceleration in the first rotational direction, said at least one first locking element is captured between said driven member and said driving member to rotational couple said driven member and said driving member together, and said at least one second locking element is not captured between said driven member and said driving member.

Preferably when the clutch speed changes from acceleration or constant speed following acceleration in the first rotational direction to deceleration in the first rotational direction, the at least one first locking element is released from between the driven and drive members and the at least one second locking element is captured between the driven and drive members, and once released the first locking element is free to move away from the outer radial position once the rotational speed of the clutch decreases below the first rotational speed.

Preferably there is a small amount of relative movement between the driven member and the driving member when the at least one first locking element is released from and the at least one second locking element is captured by the driven and driving members.

Preferably the small amount of relative movement between the driven and driving member is approximately 1 degree of relative rotation.

Preferably there are a pair of said first channels and corresponding first locking elements and a pair of said second channels and corresponding second locking elements.

Preferably the at least one first channel and the at least one first pocket are located on a first level, and the at least one second channel and the at least one second pocket are located on a second level, so that the at least one first locking element cannot interface with the at least one second pocket and the at least one second locking element cannot interface with the at least one first pocket.

Preferably when the at least one second locking element is in the locking position, the at least one second locking element rotationally couples the driven member to the driving member in the second rotational direction during acceleration or constant speed following acceleration, and when the at least one first locking element is in the locking position, the at least one first locking element rotationally couples the driven member to the driving member in the second rotational direction during deceleration or constant speed following deceleration.

Preferably the clutch comprises a bearing surface fixed to the drive shaft for vertically locating the driven member on the drive shaft, the bearing surface slidingly supporting a corresponding surface of the driven member, and friction there between causing partial rotational coupling between the driven member and the driving member.

In a third aspect, the present invention consists in a clutch for a laundry appliance comprising:

a driving member and a driven member, in use the driving member being rotationally coupled to a drive comprising a drive shaft, the drive adapted to rotate at a variable drive speed, at least one first locking element moveable from a first unlocked position to a first locking position once a portion of the clutch accelerates to a rotational speed above a first rotational speed, and at least one second locking element moveable from a second unlocked position to a second locking position once a portion of the clutch accelerates to a rotational speed above a second rotational speed, and the at least one first locking element rotationally coupling the driven member and the driving member together during acceleration or constant speed following acceleration in a first rotational direction when the at least one first locking element is in the first locking position, and the at least one second locking element rotationally coupling the driven member and the driving member together during deceleration or constant speed following deceleration in the first rotational direction when the at least one second locking element is in the second locking position, and the at least one second locking element rotationally coupling the driven member and the driving member together during acceleration or constant speed following acceleration in the second rotational direction when the at least one second locking element is in the second locking position, and the at least one first locking element rotationally coupling the driven member and the driving member together during deceleration or constant speed following deceleration in the second rotational direction when the at least one first locking element is in the first locking position, the at least one first locking element and first locking position being located on a first level, and the at least one second locking element and second locking position being located on a second level so that the at least one first locking element cannot enter the second locking position and the at least one second locking element cannot enter the first locking position.

Preferably the first rotational speed is lower than the second rotational speed.

Preferably in use the driven member is at least partially rotationally coupled to the driving member by friction, and the at least one first locking element being moveable from the first unlocked position to the first locking position once the driven member accelerates to a rotational speed above the first rotational speed.

Preferably in use the driven member is at least partially rotationally coupled to the driving member by friction, and the at least one second locking element being moveable from the second unlocked position to the second locking position once the driven member accelerates to a rotational speed above the second rotational speed.

Preferably the driven member has at least one first channel extending from an inner radial position to an outer radial position, a said first locking element being disposed in a said first channel, the locking position being at the outer radial position of the channel, the driving member having at least one first pocket, the first channel having a ramped surface, the ramped surface being inclined at a first angle from the inner radial position to the outer radial position to in use gravitationally bias the first locking element to the inner radial position, in use the first locking element moving from the inner radial position to the outer radial position under centrifugal force to enter a said first pocket at the outer radial position when said first pocket is radially aligned with said first channel when speed of the driven member accelerates to a speed above the first rotational speed, and the driven member having at least one second channel extending from an inner radial position to an outer radial position, a said second locking element being disposed in a said second channel, the locking position being at the outer radial position of the channel, the driving member having at least one second pocket, the second channel having a ramped surface, the ramped surface being inclined at a second angle from the inner radial position to the outer radial position to in use gravitationally bias the second locking element to the inner radial position, in use the second locking element moving from the inner radial position to the outer radial position under centrifugal force to enter a said second pocket at the outer radial position when said second pocket is radially aligned with said second channel when speed of the driven member accelerates to a speed above a second rotational speed.

Preferably the second angle is greater than the first angle, the second rotational speed being higher than the first rotational speed.

Preferably the first speed is approximately 60 rpm.

Preferably the second speed is approximately 140 rpm.

Preferably the driven member has an outer circumferential surface and the driving member has a inner circumferential surface facing and closely adjacent to said outer circumferential surface, the at least one first channel extending from the inner radial position to the outer circumferential surface to be open at the outer circumferential surface, and the at least one first pocket being located in the driving member inner circumferential surface, and the at least one second channel extending from the inner radial position to the outer circumferential surface to be open at the outer circumferential surface, and the at least one second pocket being located in the driving member inner circumferential surface.

Preferably the at least one first pocket is directional having an abutment side and a ramped side, and when the first locking element enters a said first pocket the first locking element rotationally couples the driving and driven sides together when accelerating in the first direction or at a constant speed following acceleration in the first direction, the first locking element being captured between the abutment side of the first pocket and a side of the first channel facing the abutment side, and the at least one second pocket is directional having an abutment side and a ramped side, and when the second locking element enters a said second pocket the second locking element rotationally couples the driving and driven sides together when decelerating in the first direction or at a constant speed following deceleration in the first direction, the second locking element being captured between the abutment side of the second pocket and a side of the second channel facing the abutment side.

Preferably the at least one first locking element and the at least one second locking element are spherical.

Preferably the ramped surface of the at least one first channel is an inclined bottom surface of said first channel, and the ramped surface of the at least one second channel is an inclined bottom surface of said second channel.

Preferably the clutch further comprises a drive element fixed to the drive shaft, the drive element locating the driven member vertically and radially with respect to the drive shaft, the driven member and drive element adapted to allow the driven member to rotate relative to the drive element, the driving member being rotationally coupled to the drive element to rotationally couple the driving member to the drive shaft.

Preferably the at least one first channel is angled to the radial direction of the clutch so that one side of the first channel is longer than an opposite side of the first channel, the longer side of the first channel facing the abutment surface of a corresponding said first pocket, and the at least one second channel is angled to the radial direction of the clutch so that one side of the second channel is longer than an opposite side of the second channel, the longer side of the second channel facing the abutment surface of a corresponding said second pocket.

Preferably the longer side of the first channel includes a dimple for receiving the first locking element when the first locking element is captured between the longer side of the first channel and the abutment side of a corresponding first pocket, and the longer side of the second channel includes a dimple for receiving the second locking element when the second locking element is captured between the longer side of the second channel and the abutment side of a corresponding second pocket.

Preferably the dimples in the longer sides of the first and second channels are positioned to lift the first and second locking elements off the ramped bottom of the first and second channels when the first and second locking elements are captured between the longer side of the first and second channel and the abutment side of a corresponding first and second pocket.

Preferably the first and second pockets each have a ceiling portion angled relative to the ramped surface of the first and second channels so that the height of the first and second pockets decreases in a radial direction outwards so that when the first and second locking elements enter the first and second pockets the first and second locking elements strike the ceiling portions to cause a reaction force to act against the first and second locking elements at a direction into the ramped surfaces of the first and second channels.

Preferably the ceiling portions of the first and second pockets are also inclined in a circumferential direction so that the height of the first and second pockets decreases in a circumferential direction from the abutment surface of the first and second pocket towards an end of the first and second pockets opposite the abutment surface.

Preferably the ceiling portion of the first and second pockets extends outside the first and second pockets in a direction towards the centre of the clutch.

Preferably when the at least one first locking element is in the outer radial position and the at least one second locking element is in the outer radial position and the driven member and the driving member are accelerating or at constant speed following acceleration in the first rotational direction, said at least one first locking element is captured between said driven member and said driving member to rotational couple said driven member and said driving member together, and said at least one second locking element is not captured between said driven member and said driving member.

Preferably when the clutch speed changes from acceleration or constant speed following acceleration in the first direction to deceleration in the first direction, the at least one first locking element is released from between the driven and drive members and the at least one second locking element is captured between the driven and drive members, and once released the first locking element is free to move to the inner radial position once the rotational speed of the clutch decreases below the first rotational speed.

Preferably there is a small amount of relative movement between the driven member and the driving member when the at least one first locking element is released from and the at least one second locking element is captured by the driven and driving members.

Preferably the small amount of relative movement between the driven and driving member is approximately 1 degree of relative rotation.

Preferably there are a pair of said first channels and corresponding first locking elements and a pair of said second channels and corresponding second locking elements.

Preferably the clutch comprises a bearing surface fixed to the drive shaft for vertically locating the driven member on the drive shaft, the bearing surface slidingly supporting a corresponding surface of the driven member, and friction there between causing partial rotational coupling between the driven member and the driving member.

In a fourth aspect, the present invention consists in a laundry appliance comprising:

a cabinet, a vessel for accommodating laundry, the vessel rotatably supported within a water tight enclosure within the cabinet, the axis of rotation being substantially vertical, a drive comprising a drive shaft the drive adapted to rotate the drive shaft at a variable drive speed, an agitator or wash plate attached to the drive shaft within the vessel, a clutch coupled between the vessel and the drive shaft, and when in an engaged condition the clutch rotationally coupling the vessel to the drive shaft to rotate the vessel relative to the water tight enclosure in use, and when in a disengaged condition, in use the drive shaft rotating substantially independently of the vessel, the clutch being as described above.

Preferably the drive accelerates at a first rate of acceleration during an agitate washing phase and at a second rate of acceleration during a continuous spin phase, the first rate being higher than the second rate.

In a fifth aspect, the present invention consists in a laundry appliance including a clutch as described above for selectively connecting a laundry vessel to a motor.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

Preferred embodiments of the invention will be described by way of example only and with reference to the drawings, in which:

FIG. 2A is a perspective view of a clutch assembly according to one embodiment of the present invention.

FIGS. 2B and 2C are exploded perspective views of the clutch assembly of FIG. 2A. FIG. 2B is viewed from above, and FIG. 2C is viewed from below.

DETAILED DESCRIPTION OF PREFERRED EMBODIMENTS

Figure 1:
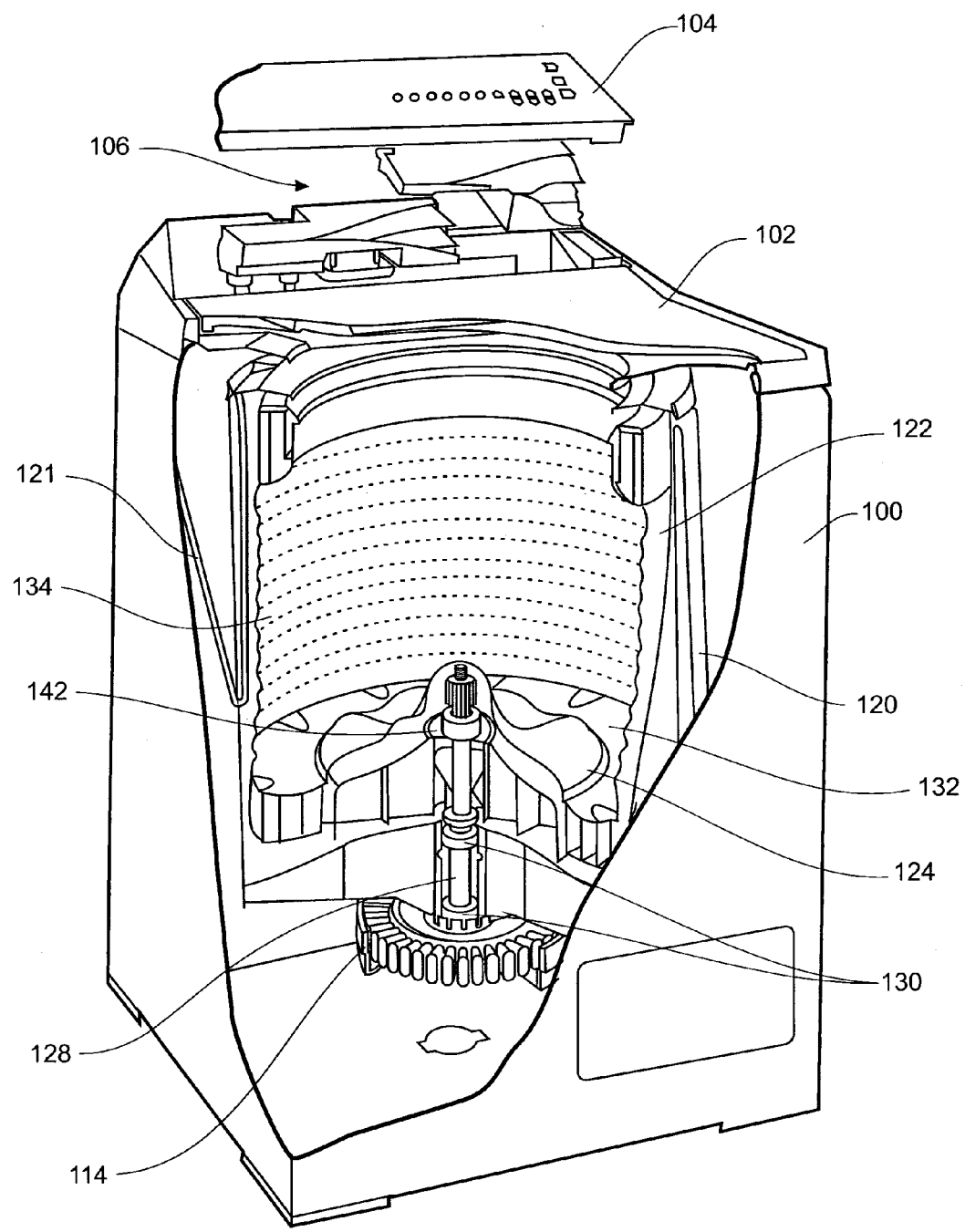
FIG. 1 is a cutaway perspective view of a laundry machine according to a preferred embodiment of the present invention.

A laundry machine that may incorporate a clutch according to the present invention is illustrated in FIG. 1. The laundry machine includes a cabinet 100 with a lid 102 and a user console 104. A controller 106 is located within the body of the user console. The controller 106 includes a power supply and a programmed microcontroller. The power supply receives power from the mains supply and supplies power to the microcontroller, to a power supply bridge for the electric motor and to ancillary devices within the machine such as a pump and valves. Delivery of power to the motor 114 and the ancillary devices is at the control of the microcontroller. The microcontroller receives inputs from a user interface on console 104.

A tub 120 is supported within the cabinet. The tub is preferably suspended from the upper edge of the cabinet, for example by suspension rods 121. The tub may alternatively be supported from below or from the sides of the cabinet. A wash or drain pump is fitted to the lower portion of the tub. The pump is preferably located at a sump portion of the tub.

A wash basket 122 is supported for rotation within the tub. Opening the lid 102 provides user access to an upper open end of the wash basket.

An agitator 124 is mounted in the lower portion of the wash basket. The agitator may be of a central post type, with or without additional moving parts, such as augers, or of a wash plate type, such as illustrated in U.S. Pat. No. 6,212,722, or of a pulsator type, or of any other type having independent movement from wash basket 122. The illustrated agitator is of wash plate type, intended for facilitating low water level wash exhibiting inverse toroidal rollover patterns.

The improvements and adaptations of the present invention are preferably implemented in a laundry machine of a direct drive type with motor fixed directly to the lower end of a single drive shaft. However other drive systems involving for example gearbox or belts driving a single drive shaft may alternatively be used.

A motor 114 below the tub directly drives single shaft 128. The single shaft 128 extends through the lower face of the tub, where it is supported in a pair of bearings 130. A seal 360 prevents water escaping the tub at the interface between the tub and shaft.

The wash basket 122 is mounted on the shaft within the tub. The wash basket may typically comprise a base 132 and a perforated cylindrical skin 134. The perforated cylindrical skin extends up from the base to define an open ended drum. The wash basket may include a balance ring at the upper edge of the cylindrical skin.

The wash plate 124 is also fitted to the shaft, within the wash basket 122. The wash plate 124 rotates with the drive shaft 128. Typically the drive will operate in a wash mode where the shaft is reciprocated in alternate directions, and a continuous rotation mode in which the shaft is rotated for longer periods in a single direction A clutch arrangement 142 is provided to enable the motor 114 to selectively drive either the wash plate 124 independently of the wash basket 122, or drive the wash basket 122. In driving the wash basket the motor may also drive the wash plate. Various mechanisms have been proposed to accomplish this selective drive.

Figure 3A:
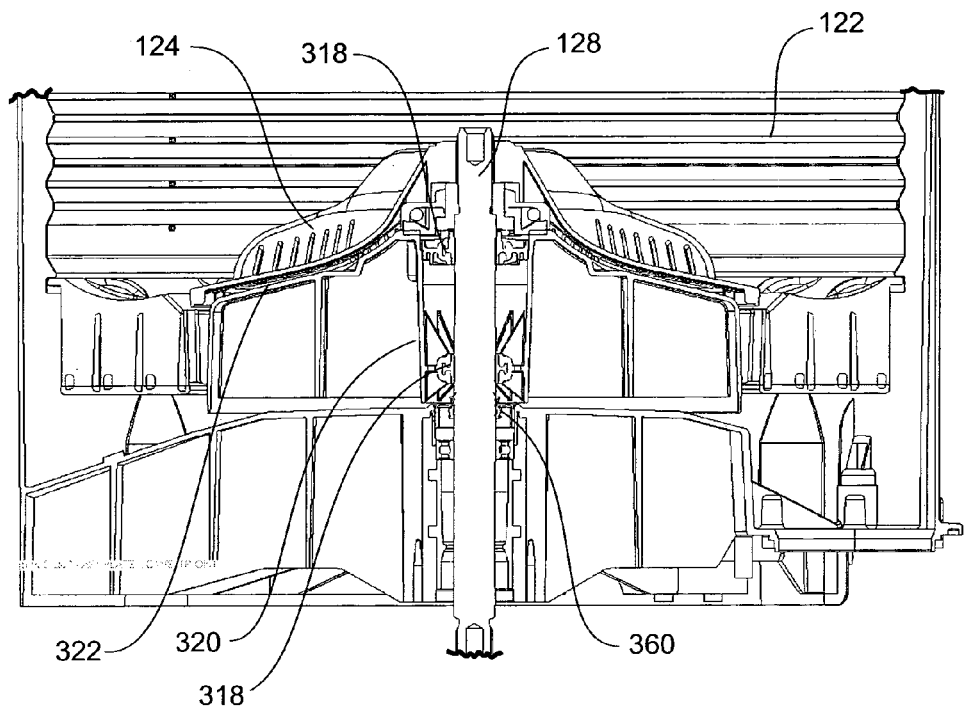
FIG. 3A is a cross sectional view of a laundry appliance including the clutch assembly of FIG. 2A.
Figure 3B:
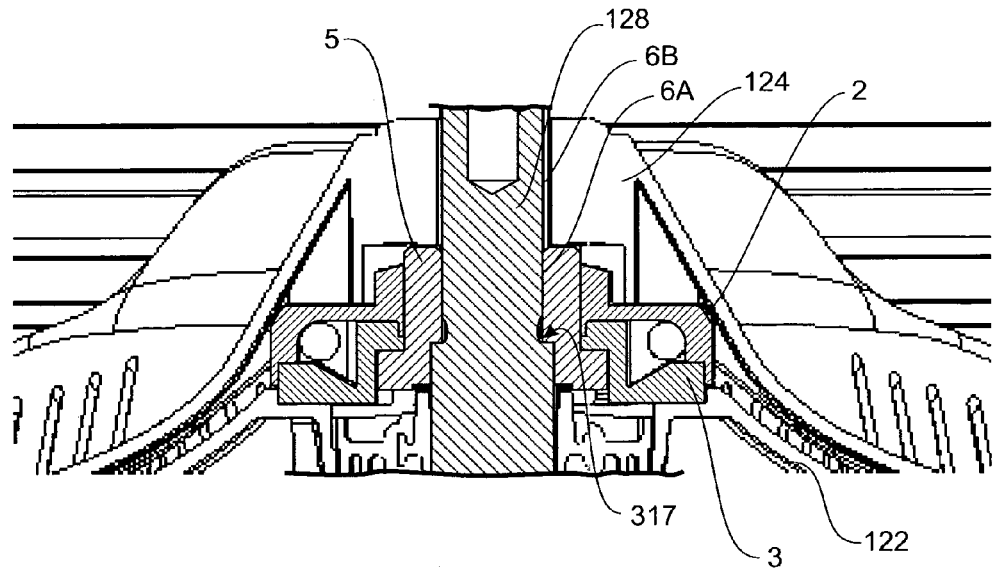
FIG. 3B is a cross sectional view of the clutch of FIG. 2A as part of a laundry appliance assembly.

With reference to FIGS. 1 to 3, a clutch 1 according to one embodiment of the present invention is described. A driving member or side 2 of the clutch 1 is coupled or attached to a drive shaft 128 of the laundry appliance. A driven member or side 3 of the clutch 1 is adapted to rotate relative to the drive shaft 128. The drive shaft passes through a central aperture in the driving member and a central aperture in the driven member.

The driving member is rotationally coupled or attached to the drive shaft. For example, as shown FIG. 3, a drive element 5 is coupled to the drive shaft, and the driving member 2 of the clutch is coupled to the drive element 5, rotationally coupling the driving member 2 to the drive shaft 128. Alternatively, the driving member 2 may be directly fitted to the drive shaft 128 without a drive element between the drive shaft 128 and the driving member 2. A drive element in the assembly is preferred, to reduce machining and associated costs that would be required to manufacture a shaft from bar stock having sufficient diameter to provide a sufficient bearing surface for vertically locating the driven member 3.

The drive shaft passes through a central aperture or bore of the drive element 5. The drive element 5 is preferably rotationally coupled to the drive shaft by internal splines 6A on the bore of the drive element 5. Internal splines 6A engage with external splines 6B formed on the outer circumference of the drive shaft 128, rotationally locking the driving element 5 to the drive shaft 128. Alternatively the drive element 5 may be rotationally keyed to the drive shaft by any other suitable means. A shoulder 317 on the drive shaft provides a weight bearing surface to locate the drive element 5 in a vertical position on the drive shaft 128.

The driving member 2 is preferably engaged to the drive element 5 by internal splines or dogs 7A formed around the central aperture of the driving member 2. Internal splines 7A engage with external splines or dogs 7B on an outer circumference of the drive element 5, to rotationally lock the driving member 2 to the drive element 5, thereby coupling the driving member 2 to the drive shaft 128. Alternatively the driving member 2 may be rotationally keyed to the drive element by any other suitable means.

The driven member 3 of the clutch is located over the shaft, the shaft passing through the central aperture of the driven member. In the preferred embodiment, the driven member fits over the drive element 5, the drive element passing through the central aperture of the driven member. The position of the driven member is defined vertically by a shoulder 8A on the drive element and a corresponding bearing surface 8B on the driven member. The driven member is positioned over drive element 5. An inner circumferential surface 9A of the central aperture of the driven member slidingly interfaces with an outer circumference 9B of drive element 5, radially locating the driven member.

To assemble the clutch assembly 1 of FIGS. 1 to 3, the drive element 5 is fitted over the drive shaft 128. The driven member is then positioned over the drive element. Splines 6A and 6B mate to rotationally lock the drive element to the shaft 128. Locking elements 12 (described below) are located in corresponding channels 10 (described below) in the driven member. The driving member 2 is then assembled over the drive shaft, drive element and driven member, splines 7A and 7B mating to rotationally lock the driven member to the drive element.

The driving member 2 is rotationally coupled to the shaft. The driven member is not rotationally coupled to the drive shaft allowing relative rotational movement between the driven and driving members.

In the preferred embodiment of the present invention, the driven member or side of the clutch is rotationally coupled to a wash basket 122, and the driving member or side of the clutch is rotationally coupled to an agitator or wash plate 124 located within the wash basket. In use the wash basket contains laundry for washing. Preferably the wash basket is assembled to the driven member prior to assembly of the driven member onto the drive element. For example, the driven side of the clutch may include dogs 31 extending downwards for interfacing with complementary dogs formed in the base of the wash basket. Dogs 31 transfer circumferentially acting loads between the driven clutch member and the spin basket. Bolts or other fixtures may be provided through holes 32 in the driven member for fixing the driven member to the spin basket.

The wash basket is rotationally supported on the shaft 128, for example by a pair of bearings 318. The bearings 318 are preferably of a sliding seal type. The bearings 318 provide radial support of the spin basket relative to the shaft. The bearings are vertically spaced on the shaft to provide torsional stability.

The wash plate 124 is assembled to the shaft 128 after the driving member 2 is fitted to the drive element 5. A bolt or capped bolt (not shown in FIG. 3) is fitted to the upper end of the drive shaft 128 to retain the wash plate and other assembled components in place.

During washing operations, clothes and washing fluid are contained with the wash basket 122. The drive is energised to oscillate the drive shaft 128 in clockwise and counter clockwise rotational directions to oscillate the agitator 124 within the wash basket to impart washing action on the clothes within the wash basket 122. During washing operations the wash basket remains relatively stationary compared to the agitating motion of the drive shaft and agitator due to the uncoupling action provided by the clutch 1.

As the drive shaft rotates in one direction, friction coupling between driving and driven components of the machine occurs. Friction coupling causes at least partial rotational coupling between the driving and driven members of the clutch. For example, friction exists between the drive member shoulder 8A and the corresponding bearing surface 8B of the driven member. Another source of friction coupling occurs between the washing basket and the agitator. Clothes and washing fluid contained within the wash basket tend to partially couple the wash basket to the agitator. As the agitator rotates, the agitator tends to drag the wash basket with it. As the drive shaft and agitator change rotational direction to rotate in the opposite direction, the wash basket tends to be left behind. During an oscillating washing action, movement of the washing basket and driven components lag behind the movement of the driving components of the assembly. The driven side of the clutch therefore moves at reduced speeds compared to the faster oscillating action of the drive shaft and driving components. During a washing operation the agitator and driving side 2 of the clutch accelerate to reach rotational speeds of up to 110 rpm before decelerating to stop and then accelerate to rotate in the opposite direction, whereas the driven side 3 of the clutch, lagging behind the driving side of the clutch, accelerates to lower speeds, typically less than 50 rpm.

During a spin or centrifugal dewatering operation, the drive shaft is energised to rotate at a high speed in one direction. As the drive shaft accelerates in one rotational direction, the driven components also accelerate due to partial rotational coupling described above. While the rotational speed of the drive shaft is increasing, rotational slip occurs between the driving machine components and the driven machine components, the rotation of the driven components lagging behind the rotation of the driving components.

Once the driving or the driven side of the clutch reaches a moderate speed, it is desirable to positively couple or lock the driven side of the clutch to the driving side of the clutch so that the drive may spin the washing basket to the high speeds necessary to effectively dewater the washing load.

The clutch 1 includes at least one locking element. The locking element is movable from an unlocked position to a locking position to rotationally couple the driven member and the driving member together. Preferably the locking element is movable from the unlocked position to the locking position once the driven member reaches a rotational speed above a first rotational speed. That is, the position of the locking element is determined by the rotational speed of the driven member or side of the clutch. Preferably the locking element is moved from the unlocked position to the locking position by centrifugal force.

The preferred clutch assembly incorporates at least one channel 10. The channel 10 extends from an inner radial position to an outer radial position. The channel can be located in either of the driving and driven members. Preferably the driven member includes the channel.

At least one locking element 12 is disposed in a corresponding channel 10. As the rotational speed of the driven member 3 increases, the locking element 12 is acted on by centrifugal force. This force urges the locking element 12 toward the outer radial end of the channel 10. Preferably the locking element 12 is a sphere, for example a ball bearing. Alternatively the locking element may be a rolling element, for example a pin. Alternatively the locking element may slide in the channel.

Preferably the channel 10 has a ramped surface or base 13 on which the locking element slides or rolls. The ramped surface 13 is inclined with the inner radial position lower than the outer radial position.

In use, the inclined surface gravitationally biases the locking element 12 to the inner radial position. When the locking element rests in the inner radial position it is in the unlocked position. The driven member may rotate relative to the driving member and drive shaft when the locking element is in the unlocked position.

Once the clutch member reaches a certain speed threshold, the centrifugal force generated by the rotational motion overcomes the gravitational force acting on the locking element and the locking element moves to the outer radial position. This is the locking position. Once in the locking position the locking element can interfere with both the driving and driven members to positively couple or rotationally lock the driving and driven members together.

For example, the locking element 12 is disposed in a channel 10 in the member 3. In the locking position, a portion of the locking element 12 remains in the channel 10, and a portion of the locking element enters a pocket 11 in the member 2. The locking element 12 causes interference between the members 2, 3, to rotationally lock the two members together.

Preferably the member 3 with the channel 10 has an outer circumferential surface 16 and the member 2 has a corresponding inner circumferential surface 26 facing the outer circumferential surface 16. The inner circumferential surface 26 includes at least one pocket 11. The channel 10 in the member 3 extends from the inner radial position to the outer circumferential surface 16. The channel is open at the outer radial position as it meets the outer circumferential surface 16.

Once the rotational speed of the member 3 increases to a threshold speed, the locking element 12 moves to the outer radial position. At a sufficient rotational speed the locking element will remain adjacent the inner circumferential surface 26 of the member 2. Once the pocket 16 aligns with the channel 10 due to relative rotation or slip between the driving and driven members, and the speed of the member 2 is high enough, the locking element 12 enters the pocket 11 while a portion of the locking element 12 remains in the channel 10. The radial depth of the pocket 11 is less than the diameter of the locking element 12 so that a portion of the locking element 12 remains in the channel 10 with the locking element at a maximum radial distance from the centre of rotation. In this position the locking element 12 bridges between the driven member and the driving member to rotationally couple the driven member and driving members together. An interference plane exists between the driven and driving members through the locking element to couple the driven and driving members together. In the illustrated embodiment, the interference plane is circumferential and extends vertically through the locking element.

The engagement plane between the driven and driving sides of the clutch does not need to be vertical. For example, the engagement plane could be horizontal or inclined. For example, the driving member could be arranged above the driven member. A channel in the driven member could extend through an upper surface of the driven member. A correspond lower surface of the driving member that faces the upper surface of the driven member would have pockets for receiving a locking element disposed in the channel of the driven member. Once a portion of the locking element extends above the upper surface of the driven member and interfaces with a pocket in the lower surface of the driving member, the driven and driving members will be locked together, with a horizontal interference plane extending through the locking element captured between the driven and driving members.

In a preferred embodiment, the clutch includes two channels 10 and two corresponding locking elements 12. The two channels are preferably diametrically opposite one another. Alternatively the clutch has more than two channels and corresponding locking elements. Preferably one locking element is disposed in each channel.

The pockets are preferably directional. That is, the pockets are shaped to allow the locking element to lock the driven and driving sides of the clutch together when accelerating in a first rotational direction, and allow the locking element to be deflected away from the locking position when decelerating in the first rotational direction or accelerating in a second opposite rotational direction so that the driven and driving sides of the clutch are not coupled together. This arrangement can provide a unidirectional clutch.

Figure 4A:
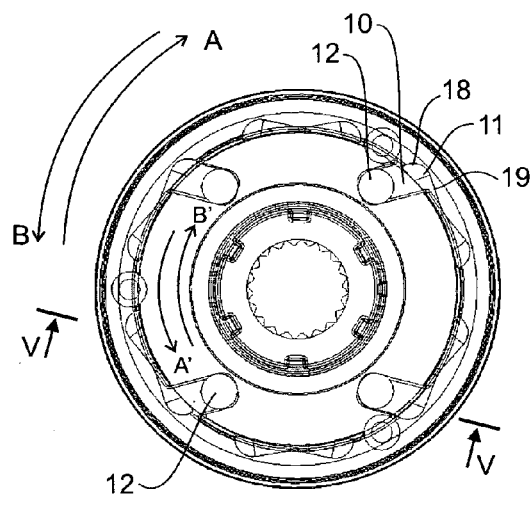
FIGS. 4A to 4E are top views on a driven side of the clutch, with an outline of a driving side of the clutch, a driving element and locking elements superimposed over the driven side to indicate an engagement relationship between the driving and driven sides of the clutch.
Figure 4B:
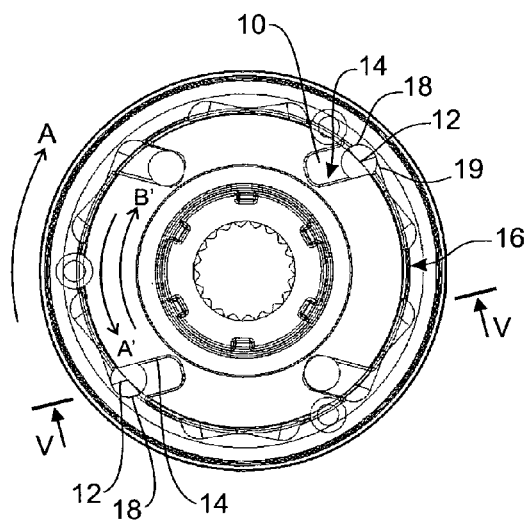

As best shown in FIG. 4A, when viewed in an axial direction with respect to the drive shaft, the pocket 11 may be described as having two sides. One side corresponds to a first rotational direction. A second side corresponds to an opposite second rotational direction. The first side provides an abutment surface 18 for the locking element 12 to bear against when in the locked position subsequent to the driven member rotating in the direction of arrow A' relative to the driving member. As shown in FIG. 4B, in the locked position the locking element 12 bears against the abutment surface 18 of the pocket 11 and an oppositely facing side 14 of the channel 10 in which the locking element is disposed. In this position, the locking element is caught or trapped by the abutment surface 18 of the pocket 11 and the oppositely facing side 14 of the channel. By example, the illustrated embodiment includes two channels 10 and corresponding locking elements 12. FIG. 4B shows both locking elements 12 in the locked position. However, in practice only one locking element may lock the driven and driving sides of the clutch together. The driven and driving members may be coupled together by a first-locking element before a second first-locking element reaches the locking position.

The abutment surface 18 of the pocket 11 is preferably shaped to match the shape of the locking element 12 so that contact between the locking element and the abutment surface 18 of the pocket is spread over the abutment surface of the pocket and the corresponding contact area of the locking element.

The second side of the pocket 11 provides a ramp surface 19 that is arranged at a slight angle to a tangent to the outer circumferential surface 16 of the driven member 3. The radial depth of the pocket 11 over the second side or ramped side 19 of the pocket gradually decreases from the depth of the abutment surface 18 of the pocket to zero at the edge of the pocket opposite the abutment surface. With the driven member rotating at a sufficient speed to position the locking element 12 against the inner circumferential surface 26 of the driving member, and with relative rotation of the driven member 3 with respect to the driving member 2 in the direction of arrow B', the ramped surface displaces the locking element 12 back into the channel as the locking element slides or rolls along the ramped surface 19, preventing locking element 12 from coupling between the driving and driven sides of the clutch.

The channel 10 may be arranged radially with respect to the clutch centre of rotation. Preferably the channel 10 is arranged at an angle to the radial direction of the clutch 1. In the illustrated embodiment the channel 10 is at an angle of approximately 30° to the radial direction of the clutch assembly.

When the locking element 12 is trapped between the abutment surface 18 of the pocket and the oppositely facing side 14 of the channel, a force is transmitted through the locking element from the driving member to the driven member coupling the two sides of the clutch together. Preferably the force is transmitted approximately through the centre of the locking element 12. The channel is angled to open the mouth of the channel so that the oppositely facing side 14 of the channel faces the abutment surface 18. By angling the channel from the radial direction, once captured between the driving and driven members, the locking element is in compression between the abutment surface and the oppositely facing side of the channel. For a clutch with radially aligned channels, the locking element is in shear when captured between the driving and driven members. The angled channel with the captured locking element in compression is preferred; as the pocket and channel can be arranged so that the force transmitted through the locking element when captured passes approximately through the centre of the locking element 12. Where the channel is radial, it is necessary to make the pocket 11 deeper than the radius of the locking element to prevent the locking element being forced back into the channel when squeezed between the driven and driving members.

Preferably there are a plurality of pockets around the inner circumference of the driving member for receiving the locking element. As shown in FIG. 4A, the illustrated embodiment includes six pockets 11 for receiving locking element 12. With six pockets, there is a maximum of less than 60 degrees of slip between the driving and driven members before a pocket aligns with the channel 11 to allow the locking element to engage with the abutment surface 18. Any number of pockets may be incorporated. Ideally as many pockets will be included in the clutch as possible given the diameter of the clutch. The higher the number of pockets, the less the maximum amount of slip will be before a pocket 11 aligns with the channel 10. The illustrated clutch embodiment has an outside diameter of approximately 90 mm, allowing a maximum of six pockets for the given locking element size. A larger clutch diameter would allow a higher number of pockets for a given locking element size. Preferably there are more pockets than channels.

Preferably the side 14 of the channel 10 facing the abutment surface 18 of the pocket 11 includes a dimple or hollow 15. The dimple 15 accepts a portion of the locking element 12 when the locking element is captured between the driving and driven members. The dimple 15 assists to securely locate the locking element 12 in the locked or captured position. The dimple 15 is preferably shaped to match the shape of the locking element 12 so that contact between the locking element and the side 14 of the channel is spread over the area of the dimple 15 and the portion of the locking element retained within the dimple.

Preferably the dimple has a frusto-spherical concave surface having a radius of curvature equal or similar to the radius of a corresponding spherical locking element.

Preferably the dimple 15 is positioned in the side 14 of the channel 10 so that once the locking element 12 locates within the dimple 15, the locking element will be raised off the base of the channel to hold the locking element above the channel base. With the locking element resting on the base 13 of the channel 10, the lower extent of the perimeter of the dimple 15 is below the equator of the locking element 12. Therefore, as the spherical locking element is squeezed between the pocket 11 and the side 14 of the channel 10, pressure exerted by the lower extent of the dimple acts on the locking element to create an upwards force component which causes the locking element to move upwards and into the dimple 15. Preferably the dimple is located so that once captured within the dimple, the locking element is raised approximately 0.5 mm off the base of the channel.

Raising the locking element off the base 13 of the channel 10 gives the locking element a small amount of potential energy which assists the locking element to return to the unlocked position when the speed of the drive shaft reduces below the speed threshold. As the speed of the drive shaft slows, slip or relative rotation occurs between the two sides of the clutch and the locking element is released from between the pocket and the side of the channel. The locking element drops down out of the dimple onto the base of the channel. The drop from the dimple to the base of the channel gives the locking element additional kinetic energy to begin rolling down the channel away from the locking position; compared to if the locking element was not raised above the base of the channel.

In one preferred form, the clutch assembly comprises at least one locking element for coupling the two sides of the clutch together during acceleration of the driving member 2 by the motor in a first rotational direction, and at least one locking element for coupling the two sides of the clutch together during deceleration of the driving member in the first rotational direction.

As shown in FIG. 4A, the clutch assembly comprises two locking elements 12 and associated channels 10 and pockets 11 for coupling the two sides 2, 3 of the clutch together during acceleration in the first rotational direction (indicated by arrow A). The clutch assembly further comprises two locking elements 22 and associated channels 20 and pockets 21 for coupling the two sides of the clutch 2, 3 together during deceleration in the first rotational direction A, which is equivalent to acceleration in an opposite second rotational direction (indicated by arrow B). Alternatively, the clutch may comprise a plurality of locking elements and associated channels and pockets for coupling the two sides of the clutch together during acceleration in the first rotational direction, and a plurality of locking elements and associated channels and pockets for coupling the two sides of the clutch together during deceleration in the first rotational direction A.

As shown in FIG. 4A, the channels and pockets are directional and therefore the channels 10 and pockets 11 for locking the two sides of the clutch together during acceleration in the first rotational direction A are arranged in an oppositely to the channels 20 and pockets 21 for locking the two sides of the clutch together during deceleration in the first rotational direction A. That is, channels 10 and 20 and pockets 11 and 21 are mirror opposites through an appropriate diameter of the clutch, as shown in FIG. 4A. However, channels 10 and 20 and pockets 11 and 21 do not need to be mirror opposites.

The speed threshold at which the locking element centrifuges out from the inner radial position and reach the outer radial position is determined by the friction between the locking element 12, 22 and the driven member 3, and the slope of the relevant inclined channel base surface 13 or 23. A different speed threshold can be achieved by using a different incline angle for the channel base. For example a different threshold speed may be desirable for the first locking elements 12 and the second locking elements 22.

Figure 5A:
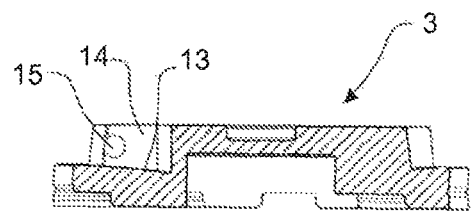
FIG. 5A is a cross sectional view of the driven member as shown in FIG. 4B, the section being on line V-V in FIG. 4B.
Figure 5B:
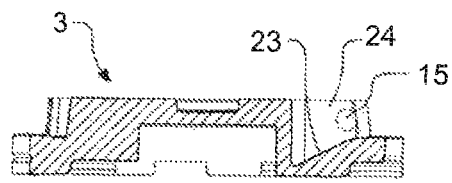
FIG. 5B is a cross sectional view of the driven member as shown in FIG. 4A, the section being on line V-V in FIG. 4A.

For example, the base surface of channels 10 are inclined to achieve a speed threshold of approximately 60 rpm for the first locking elements to reach the outer radial position, and the base surface of channels 20 are inclined to achieve a speed threshold of approximately 140 rpm for the second locking elements to reach the outer radial position. As shown in FIGS. 5A and 5B, channel base surface 13 has an incline of approximately 6° and channel base surface 23 has an incline of approximately 30°. However, the speed threshold (the first speed threshold) for the first locking elements 12 should be related to the speed of the clutch during agitation. Where the channels and locking elements are provided in the driven member, the first speed threshold should be greater than the speed the driven member reaches during agitation of the wash plate or agitator. Where the channels and locking elements are provided in the driving member, the first speed threshold should be greater than the speed the driving member reaches during agitation of the wash plate or agitator.

The second speed threshold (the speed at which the second locking elements centrifuge out to reach the outer radial position) should be greater than the first speed threshold so that the first locking elements engage the driven and driving members together before the second locking elements move to the locking position.

However, the difference in speed between the first and second thresholds should not be too great. At a speed in direction A greater than the first speed threshold and less than the second speed threshold, the first locking elements will have coupled the driven and driving sides of the clutch together, and the second locking elements will not be in their radially outermost locking position. Should the drive decelerate in direction A, the first locking elements will unlock but the second locking elements will not be in the locking position so will not couple the driven and driving sides of the clutch during deceleration (this operation is explained further below). The second speed threshold should be as close to the first speed threshold as possible while ensuring the first locking elements engage the driven and driving members together before the second locking elements reach the locking position.

In the preferred embodiment the locking elements are moveable from the unlocked position to the locking position by centrifugal force. In the preferred embodiment they are biased inwards by gravity. They could alternatively be biased inwards by a spring force.

Alternatively, the locking elements could be electrically actuated between the unlocked and locking positions. For example, the locking element could be solenoid operated, the solenoid energisation being speed dependent. For example a tachometer could measure the speed of a rotating component. Once a speed threshold is reached, a controller could energise a solenoid to move a locking element to engage the driven and driving sides of the clutch.

The clutch is preferably kept dry and free from washing fluids during use. The agitator or wash plate may be formed in a bell shape open at the bottom. The bell shaped agitator fits over the top of the clutch assembly as described earlier. The clutch assembly is therefore located within the volume provided by the bell shaped agitator and towards the top of the bell. To wash clothes contained in the washing basket, washing fluid, for example water and detergent, is added to the machine and the washing basket. As the machine and washing basket is filled, the fluid level rises above the bottom of the agitator trapping air within the bell shaped agitator. As the fluid level increases, the air trapped in the bell prevents fluid reaching the height of the clutch, keeping the clutch assembly dry and free from contamination.

An additional or alternative means may be used to ensure fluid or contamination does not reach the locking elements and channels within the clutch assembly. For example, a first seal may be provided at an inner circumferential position between the driving and driven members, and a second seal provided at an outer circumferential position between the driving and driven members, to prevent fluid ingress.

Figure 6:
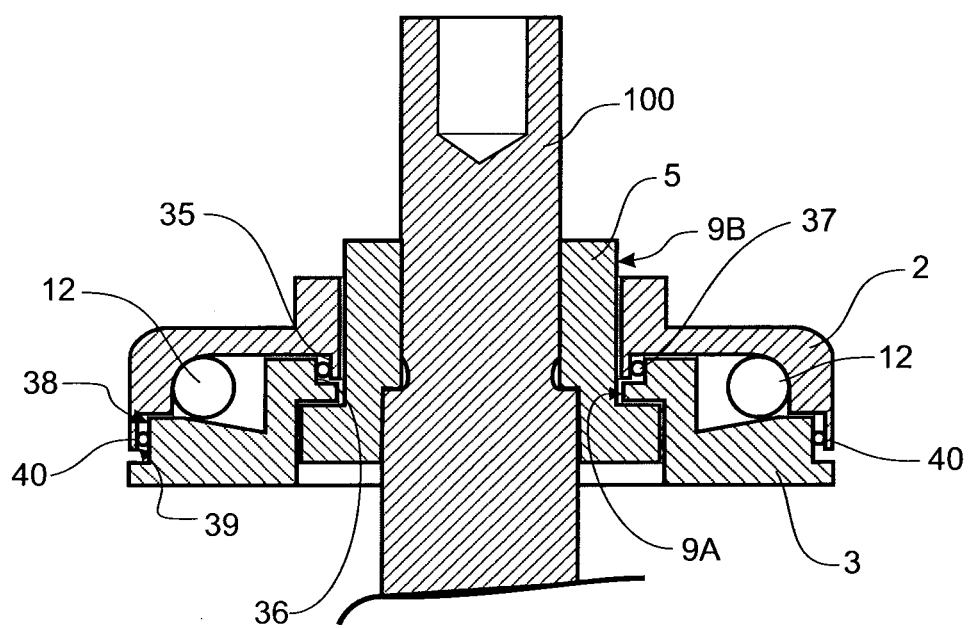
FIG. 6 is a diagrammatical cross sectional view of the clutch assembly of FIG. 2A
Figure 7B:
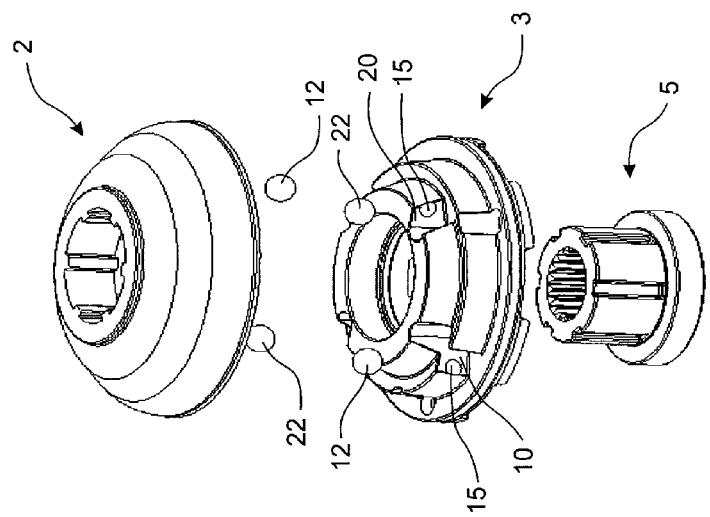
FIGS. 7A and 7B are exploded perspective views of a clutch assembly according to a second embodiment of present invention.
Figure 7A:
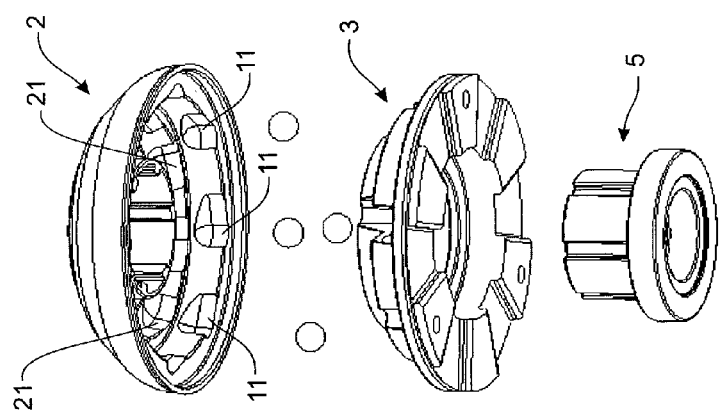

As shown in FIG. 6, the driving member 3 has an inner circumferential sealing surface 35 and the driven member has a corresponding inner circumferential sealing surface 36. A first circumferential seal 37 is disposed between circumferential surfaces 35 and 36. Similarly, the driven member has an outer circumferential sealing surface 38 and the driving member has a corresponding outer circumferential sealing surface 39. A second circumferential seal 40 is disposed between circumferential surfaces 38 and 39. The seals 37, 40 and sealing faces 35, 36 and 38, 39 may be arranged according to any typical sealing arrangement known in the art. For example, seals 37 and 40 may be arranged in seal grooves machined into each sealing face of the driven member. A single seal may be provided at each sealing face 35, 36 and 38, 39, or for example, dual seals may be provided at each sealing face. The arrangement indicated in the schematic of FIG. 6 is by example only. The inner circumferential sealing face 36 of the driven member may, for example, be arranged to face radially outwards, the corresponding sealing face 35 of the driving member therefore being arranged to face radially inwards, rather than the arrangement depicted in FIG. 6.

Operation

The operation of the machine and clutch is described with reference to FIGS. 4A to 4E. When the driving components of the clutch are rotated at low speed, friction coupling between the driving and driven components of the clutch causes the driven side 3 of the clutch to rotate at speeds less than a first threshold speed. First locking elements 12 and second locking elements 22 remain at or near an inner radial position within their respective channels 10 and 20, as shown in FIG. 4A.

When the agitator is oscillated back and forth, the driving components and driving side 2 of the clutch may be accelerated up to a speed of approximately 110 rpm without engaging the clutch, because the driven side of the clutch never reaches the first threshold speed due to the constant change in direction of the drive. The driven side of the clutch is therefore allowed to move independently of the shaft and agitator.

During oscillating washing motion, the wash bowl coupled to the driven side of the clutch can move independently of the driving oscillating motion of the agitator.

Once a washing cycle is completed, the machine initiates a dewatering or spin cycle. Generally, wash fluid is drained from the wash basket before commencing a high speed spin operation to remove remaining wash fluid from the clothes contained in the wash basket. At the start of the spin cycle, the shaft and driving components are accelerated in a first direction indicated by arrow A in FIG. 4A. As the driving components are accelerated in the first direction, friction coupling between the driving and driven components causes the driven components to also rotate in the first direction A. Slip or relative rotation occurs between the driving side and driven side of the clutch, the driven side turning at a lower speed (the driven side of the clutch having a relative rotational direction A' with respect to the driving side of the clutch). As the speed of the driving components increases in direction A, so does the speed of the driven components. Once the speed of the driven side of the clutch reaches the first speed threshold, first locking elements 12 have centrifuged outwards to reach their outer radial position within channels 10. Due to slip between the driving and driven sides, pockets 21 slip past first locking elements 12 in the direction of arrow A. The first locking elements may enter pockets 21, however, due to the ramped portion 29 of these pockets, first locking elements 12 do not engage with pockets 21 as described earlier. Once a pocket 11 aligns with a channel 10, the first locking element enters the pocket and engages with the abutment surface 18 of the pocket, locking the driven and driving sides of the clutch together, as shown in FIG. 4B. The second locking elements 22 remain in or near their inner radial position of their respective channels. The drive continues to accelerate the driving components and driven components together in direction A. Speed of the washing basket is therefore controlled by the drive during acceleration in the first direction above the first threshold speed. The washing basket may reach speeds greater than 1000 rpm during a dewatering spin operation.

Once the speed of the drive increases and the driven side of the clutch reaches a second threshold in direction A, the second locking elements 22 have centrifuged outwards to reach their outer radial position within channels 20. The second speed threshold is higher than the first speed threshold.

Figure 4C:
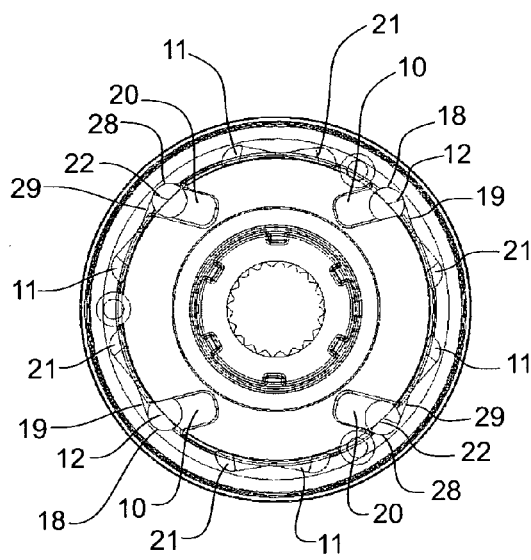

Due to the first locking elements 12 locking the driving and driven sides of the clutch together during acceleration in the first direction A, pockets 21 are aligned with channels 20 and the second locking elements 22 enter pockets 21 once the second threshold is reached. However, although second locking elements 22 are in their outer radial positions bridging between channel 20 and pocket 21, the second locking elements 22 do not provide a locking action between the driving and driven sides of the clutch while the drive continues to accelerate in the first direction A. Locking elements 22 are retained loosely in the outer radial position, and are not trapped between the corresponding abutment surface 28 and side 24 of channel 20. The second locking elements take no load while the drive continues to accelerate in the first direction A. This situation is shown in FIG. 4C.

Figure 4D:
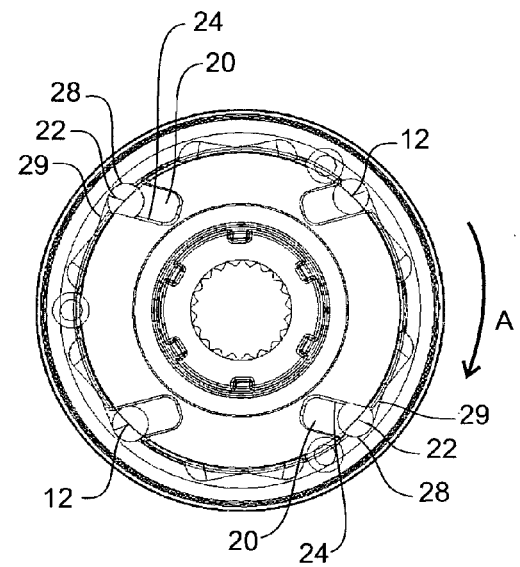

The channels 10, 20 are arranged so that there is approximately 1° of backlash in the clutch between being locked by elements 12 as a result of acceleration in the first direction and being locked by elements 22 as a result of deceleration in the first direction. That is, once the drive stops accelerating in the first direction A, and then begins decelerating in the first direction A, the driven components may temporarily freewheel to rotate relative to the driving components. The backlash allows driven member 3 to rotate by approximately 1° relative to the driving member 2 in the direction of arrow B' while the driving and driven sides 2, 3 of the clutch continue to rotate in the direction of arrow A. Once the driven side has lagged the driving side by approximately 1° of relative rotation, the second locking elements are trapped between abutment surface 28 or pocket 21 and side 24 of channel 20, coupling or locking the driven and driving sides of the clutch together as the drive decelerates in direction A (equivalent to accelerating in direction B) or rotates at a constant speed following deceleration. As the speed of rotation is above the first speed threshold the first locking elements remain in their outer radial position bridging between channel 10 and pocket 11, but are released from between the side 14 of the channel 10 and the abutment surface 18 of pocket 11. The first locking elements 12 do not provide a locking action between the driving and driven sides of the clutch while the drive continues to decelerate in the first direction A. Locking elements 12 remain loosely in their outer radial position, and are not trapped between the corresponding abutment surface 18 and side of channel 14. The first locking elements take no load while the drive continues to decelerate in the first direction A. This situation is shown in FIG. 4D.

Once the second locking elements are captured between the driving and driven sides of the clutch, the drive can control the deceleration in direction A and therefore the braking rate of the washing basket.

The clutch is direction dependent. A high speed spin operation must only be performed in the first direction, so that the first locking elements engage with the correct pockets. The first locking elements act as driving elements during acceleration of the drive in the first direction, and the second locking elements act as braking elements during deceleration of the drive rotating in the first direction.

As the drive continues to decelerate, the braking locking elements 22 will remain captured between the channel 20 and the pocket 21 until the drive stops. The braking elements provide controlled deceleration of the washing basket until the drive stops. As the driving locking elements 12 are not captured during deceleration, once the speed decreases to the first threshold, the driving locking elements move inwardly from their outer radial positions until they eventually return to their inner radial position once the speed drops sufficiently. The braking elements 22 are only released once the drive completely stops and relative movement between the driving and driven sides of the clutch occurs.

The clutch of the present invention provides uncoupling between the drive and the washing basket at low speeds in both a forward and reverse direction. That is, the clutch provides uncoupling between the drive and the washing basket where the speed of the driven side of the clutch is less than the first threshold. Furthermore, the clutch provides coupling between the drive and the washing basket in both forward and reverse directions at speeds greater than the second threshold (except for a small amount of back lash when there is a change in speed or change in direction or both).

Figure 4E:
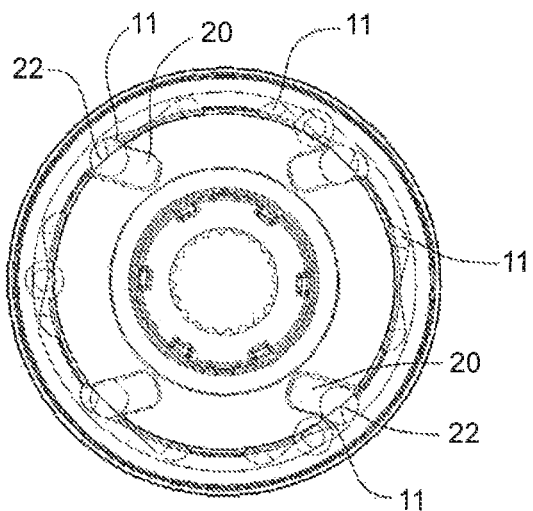

The first and second channels are inclined from horizontal to achieve different engagement threshold speeds for the first and second locking elements. This is to prevent the chance of the second locking elements incorrectly engaging before the first locking elements in the incorrect pockets. This undesirable situation is shown in FIG. 4E.

Dual Level Clutch

A further improvement to the clutch of the present invention is achieved by arranging the channels 20 and pockets 21 relating to deceleration in the first direction of rotation at a different level to the channels 10 and pockets 11 relating to acceleration in the first direction of rotation. This embodiment is shown in FIGS. 7 to 11. By locating the pockets and channels relating to the first direction at a different level to the pockets and channels relating to the second direction, the first and second locking elements cannot interface with or contact the incorrect pockets. The first locking elements 12 will interface or touch the first pockets 11 only, and the second locking elements 22 will interface or touch the second pockets 21 only. This avoids the chance of a false engagement as shown in FIG. 4E where the second locking elements 22 have incorrectly engaged with a first pocket 11. It is not necessary for the first and second speed thresholds to be different to prevent false engagement. The dual level clutch could use the same speed threshold for the locking elements in both the first and second acceleration directions. The dual level clutch is a bi-directional clutch. The dive may accelerate in either direction. Whereas the single level clutch described earlier must initially accelerate in the first direction only to ensure there is no false engagement of the first locking elements 12 with the second pockets 21.

Figure 8:
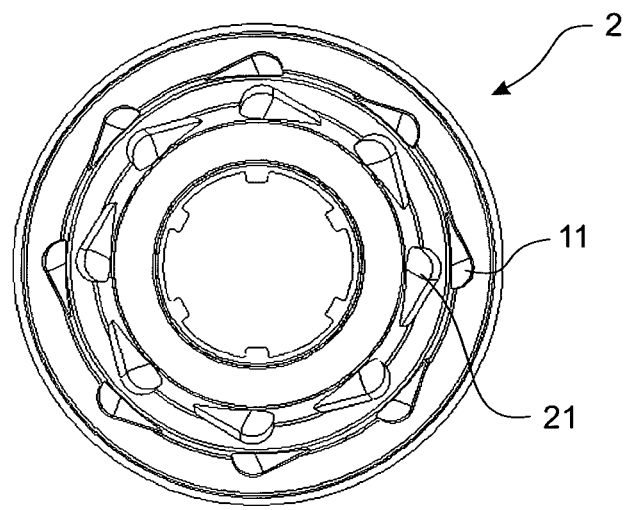
FIG. 8 is a bottom view showing the inside surfaces of the driving member of the clutch of FIGS. 7A and 7B.
Figure 9:
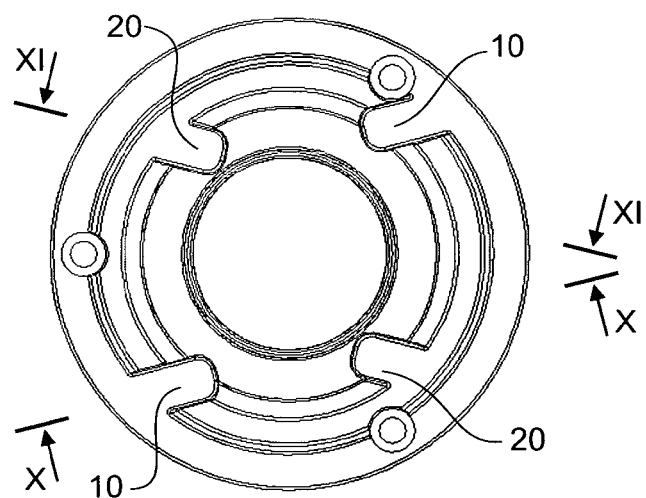
FIG. 9 is a top view of the driven member of the clutch of FIGS. 7A and 7B.
Figure 10:
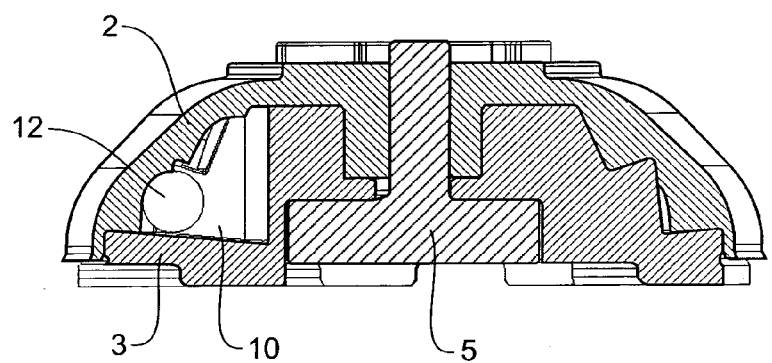
FIG. 10 is a cross sectional view of the clutch of FIGS. 7A and 7B, the section being through a channel relating to a first rotational direction as indicated by line X-X in FIG. 9.
Figure 11:
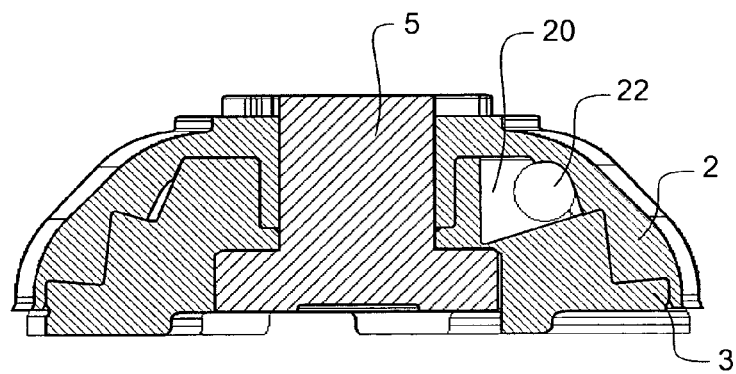
FIG. 11 is a cross sectional view of the clutch of FIGS. 7A and 7B, the section being through a channel relating to a second rotational direction as indicated by line XI-XI in FIG. 9.

Furthermore, by locating the different direction pockets at different levels, a higher number of pockets 11, 21 relating to each direction of rotational acceleration may be provided for a given clutch diameter. The higher the number of pockets, the less the amount of slip required between the driving and driven members to achieve engagement of the locking elements and sides of the clutch. The lower the slip, the lower the speed difference is between the sides of the clutch prior to engagement, resulting in smoother operation of the clutch. For example, as shown in FIG. 8, the dual level clutch provides eight pockets for each direction of rotation whereas the single level clutch of FIG. 2 has six pockets.

A further improvement is described with reference to a two level clutch according to an alternative embodiment of the present invention, as illustrated in FIGS. 12 to 15. The driving member is rotationally coupled to the drive shaft of a washing machine by the agitator of the washing machine. For example, the driving side 2 of this embodiment includes dogs 60 for rotationally coupling the driving member to the agitator of a washing machine. The agitator is rotationally coupled to the drive shaft of the washing machine.

An angled face 33, 34 is provided at each pocket 11, 21 of the clutch. The angled face is located in an upper portion of the pocket 11, 21. The angled face forms at least a portion of the ceiling of each pocket. The angled face is angled or inclined relative to the base 13, 23 of the corresponding channels of the clutch in a radial direction. The angled face is angled so that the height of the pocket decreases in a radial direction outwards. For example, the angled face is angled at 30° to the base of the corresponding channel.

Figure 14:
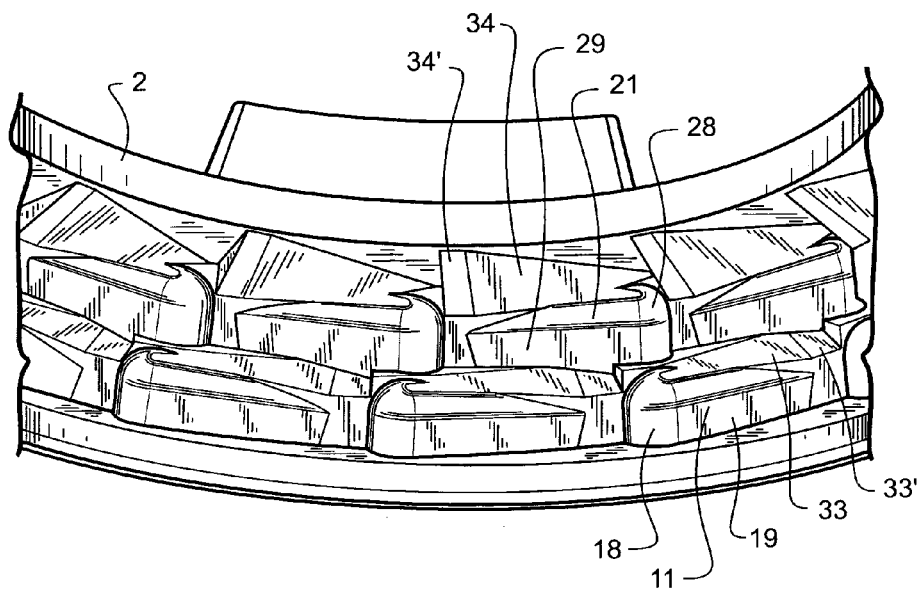
FIG. 14 is a part view of the driving side shown in FIG. 12.
Figure 15:
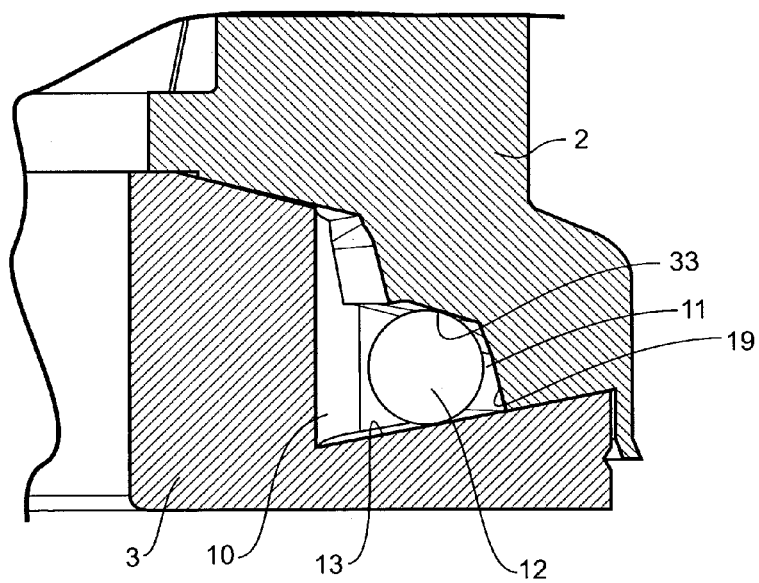
FIG. 15 is a cross sectional view of the driving side of FIG. 12, the section being taken on line XV-XV of FIG. 13.

As best shown in FIG. 14, as the locking element 12 moves towards the locking position, the locking element initially strikes the angled face or ceiling 33 of the pocket 11.

Without the angled face, the locking element initially strikes a side of the pocket (generally within the ramp surface 19 of the pocket) approximately normal to the base 13 of the channel 10. Where the locking element enters the pocket and strikes a surface normal to the base of the channel, a reaction force acts against the locking element at a direction parallel to the base of the channel. The reaction force causes the locking element to be forced or bounced back down the inclined base 13. Should the locking element 12 be bounced back down the channel 10 away from the pocket 11, the locking element may fail to be captured in the pocket at the abutment surface 18 between the two sides 2, 3 of the clutch. Alternatively, the sides of the pocket 18, 19 may be arranged axially with respect to the rotational axis of the clutch such that there is an obtuse angle between the sides of the pocket and the base of the channel. Without the angled face, as the locking element hits the side of the pocket, the locking element can be bounced or forced back down the inclined base and away from the pocket.

By providing the angled face or ceiling 33, 34, when the locking element 12, 22 enters the pocket 11, 21 and strikes the angled face 33, 34 of the pocket, the angle of the face creates a force component acting on the locking element at a direction into the base 13, 23 of the channel 10, 20. Such a force component that is directed into the base of the channel has been found to prevent the locking element from being bounced back along the channel and out of the pocket. The angled face or ceiling at the pocket helps to prevent the locking element from being bounced out of the pocket as the locking element strikes a surface of the pocket.

Figure 13:
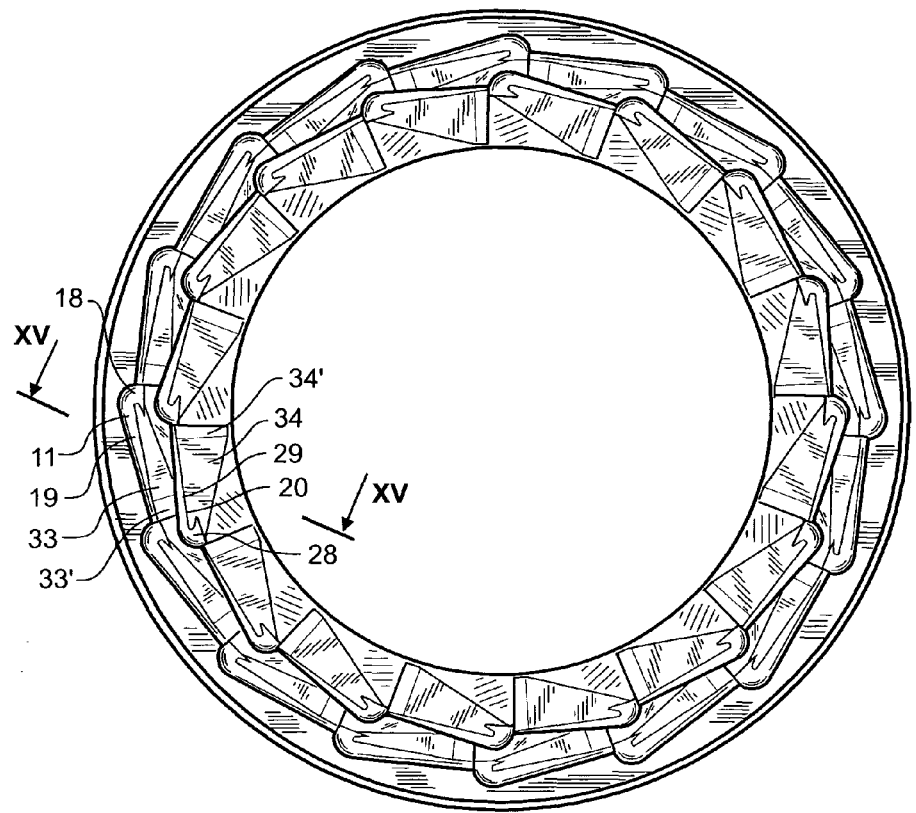
FIG. 13 is view on the inside surfaces of the driving side shown in FIG. 12.

As best shown in FIG. 13, the angled face or ceiling portion 33, 34 is also inclined in a circumferential direction of the clutch so that the height of the pocket decreases in a circumferential direction from the abutment surface 18, 28 towards an end of the pocket opposite the abutment surface.

The inclusion of the angled face 33 in the pocket prevents the locking element reaching the full depth of the pocket and hitting the side of the pocket normal or approximately normal to the base of the channel when the locking element is away from the abutment side of the pocket.

The height of the angled face or ceiling 33, 34 from the base of the channel increases along a circumferential direction towards the abutment side 18 of the pocket so that as the locking element moves along the angled face 33, 34 of the pocket towards the abutment side of the pocket the locking element also travels radially outwards towards the full depth of the pocket.

Once the locking element is at the locking position and bearing against the abutment side 18 of the pocket, the height of the angled face or ceiling 33 at the locking position is greatest and the locking element reaches the full depth of the pocket.

Figure 12:
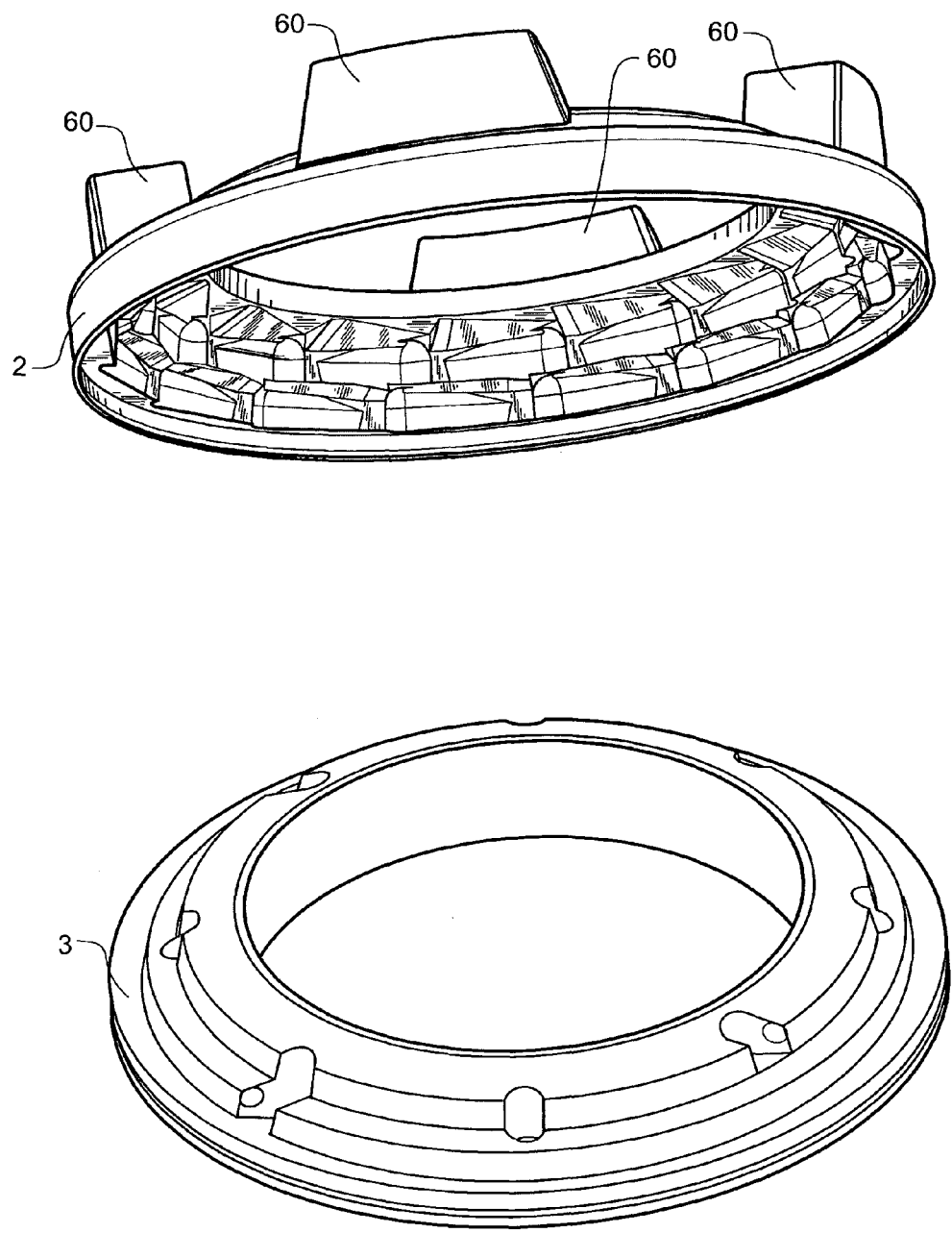
FIG. 12 shows a driven side and a driving side of a clutch according to an alternative embodiment of the present invention.

In the illustrated embodiment of FIGS. 12 to 14, the angled face or ceiling 33, 34 does not extend fully to the abutment side of the pocket.

The depth of the pocket decreases towards zero in a circumferential direction away from the abutment side of the pocket. In order that the locking element hits the angled surface or ceiling 33, 34 before hitting the ramped side 19, 29 of the pocket, the angled face or ceiling 33, 34 should have at least a portion outside the pocket extending towards a centre of the clutch.

As the angled face or ceiling 33, 34 is inclined in both the radial and circumferential directions of the clutch, the radial distance the angled face or ceiling extends outside the pocket and towards the centre of the clutch decreases in a circumferential direction towards the abutment side of the pocket.

To provide a continuous surface for the locking element to bear against, the angled face or ceiling 33, 34 may include a portion 33', 34' that extends between adjacent pockets in a circumferential direction of the clutch. However, the height of the ceiling portion 33', 34' extending along the circumferential surface 26 between adjacent pockets is constant in the circumferential direction.

The inclusion of the angled face or ceiling 33, 34 at each pocket has been described with reference to a two level clutch according to the present invention. However, a single level clutch according to an embodiment of the present invention may also include an angled face or ceiling 33 as described with reference to the two level clutch.

The clutch of the present invention provides independent motion between the driving and driven components of the machine at speeds below the engagement threshold for unlimited revolutions in either direction.

For speeds above the second threshold, the clutch is locked in both directions except for a small amount of backlash. This provides controlled acceleration and deceleration of the laundry containing wash basket.

It is desirable engagement between the driving and driven sides of the clutch occurs at low speeds. A low speed of engagement results in smooth operation of the clutch. In one embodiment, the channels and locking elements are provided in the driven member and so the clutch engagement is controlled by the speed of the driven member. This provides a benefit whereby the drive and agitator can reach speeds higher than a desirable engagement speed without engagement of the clutch.

Acceleration of the driving member during agitation may be controlled to a higher rate compared to the rate of acceleration at the beginning of a spin cycle. The higher rate of acceleration during agitator results in a higher amount of slip or lag between the driven and driving sides of the clutch. The agitator may reach a speed of 110 rpm before the drive decelerates to turn in the opposite direction. However, due to slip between the driving and driven sides of the clutch due to partial coupling by friction, the driven side of the clutch only reaches speeds of up to 50 rpm, less than the first speed threshold of 60 rpm.

At the beginning of a spin operation, the drive accelerates at a lower rate, causing a lower rate of slip between the driving and driven sides of the clutch. A lower speed differential between the driven and driving sides of the clutch results, and the clutch engages at the first threshold with the driving member turning at a lower speed compared to the speeds achieved during the higher acceleration agitate phase of the washing cycle.

Therefore, as the position of the locking elements is determined by the speed of the driven side of the clutch, through control of the drive acceleration rate, agitate speeds above the clutch engagement speed achieved during spin can be reached.

Alternatively, the acceleration rate during spin and agitate can be the same. But due to a short stroke length in one direction of rotation during agitate; the driven side of the clutch does not reach the speed threshold for clutch engagement.

The foregoing description of the invention includes preferred forms thereof. Modifications may be made thereto without departing from the scope of the invention.

The invention claimed is:

1. A laundry appliance comprising:
   a tub for holding washing liquid,
   a rotatable wash basket located within the tub,
   an agitator mounted in a lower portion of the wash basket, the agitator rotatable relative to the wash basket,
   a variable speed drive having a drive shaft rotatable by the drive at adjustable selected speeds and in clockwise and counter clockwise rotational directions,
   a clutch for selectively locking the agitator and wash basket for rotation together, the clutch comprising:
      a driving member rotationally coupled to the drive shaft and to the agitator,
      a driven member which is at least partially rotationally coupled by a frictional coupling to the driven member, the driven member also rotationally coupled to the wash basket, and
      at least one locking element which, during rotation of the driving member in the clockwise or counter clockwise rotational direction at a speed which causes the driven member, via the frictional coupling, to rotate below a first rotational speed in the clockwise or counter clockwise rotational direction, is in an unlocked position in which the driving and driven members are able to rotate at different rotational speeds and which moves to a locking position in which the at least one locking element contacts the driven member and the driving member and locks them together so that they rotate at the same rotational speed once the speed of the driving member increases sufficiently in one rotational direction to cause the driven member, via the frictional coupling, to rotate at or above the first rotational speed.

2. The laundry appliance as claimed in claim 1, the driven member having at least one channel extending from an inner radial position to an outer radial position, a said locking element being disposed in a said channel, the locking position being at the outer radial position of the channel.

3. The laundry appliance as claimed in claim 2,
   the driving member having at least one pocket, and
   the channel having a ramped surface, the ramped surface being inclined from the inner radial position to the outer radial position to gravitationally bias the locking element to the inner radial position.

4. The laundry appliance as claimed in claim 2, wherein there are a pair of said channels and a corresponding pair of said locking elements.

5. The laundry appliance as claimed in claim 3, wherein the driven member has an outer circumferential surface and the driven member has an inner circumferential surface facing and closely adjacent to said outer circumferential surface,
   the at least one channel extending from the inner radial position to the outer circumferential surface to be open at the outer circumferential surface, and
   the at least one pocket being located in the driven member inner circumferential surface.

6. The laundry appliance as claimed in claim 3,
   the locking element moving from the inner radial position to the outer radial position under centrifugal force to enter a said pocket at the outer radial position when said pocket is radially aligned with said channel when the speed of the driven member accelerates to a speed at or above the first rotational speed, said locking element being captured between said driven member and said driving member at the outer radial position to rotationally couple said driven member and said driving member together.

7. The laundry appliance as claimed in claim 6, wherein the at least one pocket is directional, the pocket having an abutment side and a ramped side, and when the locking element enters a said pocket the locking element rotationally couples the driving and driven members together when accelerating in a first direction or at a constant speed following acceleration in the first direction, the locking element being captured between the abutment side and a side of the channel facing the abutment side.

8. The laundry appliance as claimed in claim 7, wherein when the locking element enters a said pocket and the driven member is rotating relative to the driven member in a second rotational direction opposite to the first rotational direction, the locking element moves along the ramped surface to be displaced back into the channel thereby preventing rotational coupling between the driving and driven members.

9. The laundry appliance as claimed in claim 7, wherein the at least one channel is angled to the radial direction of the clutch so that one side of the channel is longer than an opposite side of the channel, the longer side of the channel facing the abutment side of a corresponding said pocket.

10. The laundry appliance as claimed in claim 9, wherein the longer side of the channel includes a dimple for receiving the locking element when it is captured between the longer side of the channel and the abutment side of a corresponding pocket.

11. A laundry appliance clutch comprising:
a driving member and an driven member, the driving member adapted to be rotationally coupled to a drive comprising a drive shaft, the driving member and driven member at least partially rotationally coupled by a frictional coupling,
locking elements in one of the driving member or driven member, the locking elements comprising:
at least one first locking element moveable from an unlocked position to a locking position once said one of the driving member or the driven member accelerates to a rotational speed above a first rotational speed, and
at least one second locking element moveable from an unlocked position to a locking position once said one of the driving member or the driven member accelerates to a rotational speed above a second rotational speed,
the driven member adapted to rotate relative to the driving member and drive shaft when the first and second locking elements are in their unlocked positions, and
the at least one first locking element, during rotation in a first rotational direction, rotationally locking the driven member and the driving member together during acceleration or constant speed following acceleration of the driving member when the at least one first locking element is in the locking position, the at least one first locking element being captured between the driving member and driven member, and
the at least one second locking element, during rotation in the first rotational direction, rotationally coupling the driven member and the driving member together during deceleration or constant speed following deceleration of the driving member when the at least one second locking element is in the locking position, deceleration of the driving member in the first rotational direction resulting in relative rotation between the driving member and driven member which, while the speed of said one of the driving member or the driven member is above the second rotational speed, allows the at least one first locking element to be released from being captured between the driving member and the driven member and allows the at least one second locking element to be captured between the driving member and the driven member.

12. The laundry appliance clutch as claimed in claim 11, the driven member having at least one first channel extending from an inner radial position to an outer radial position, a said first locking element being disposed in a said first channel, the locking position being at the outer radial position of the channel,
the driven member having at least one first pocket,
the first channel having a ramped surface, the ramped surface being inclined at a first angle from the inner radial position to the outer radial position to gravitationally bias the first locking element to the inner radial position,
the first locking element moving from the inner radial position to the outer radial position under centrifugal force to enter a said first pocket at the outer radial position when said first pocket is radially aligned with said first channel when speed of the driven member accelerates to a speed above the first rotational speed, and
the driven member having at least one second channel extending from an inner radial position to an outer radial position, a said second locking element being disposed in a said second channel, the locking position being at the outer radial position of the channel,
the driving member having at least one second pocket,
the second channel having a ramped surface, the ramped surface being inclined at a second angle from the inner radial position to the outer radial position to gravitationally bias the second locking element to the inner radial position,
the second locking element moving from the inner radial position to the outer radial position under centrifugal force to enter a said second pocket at the outer radial position when said second pocket is radially aligned with said second channel when speed of the driven member accelerates to a speed above a second rotational speed.

13. A laundry appliance including the laundry appliance clutch as claimed in claim 11, for selectively connecting a laundry vessel to the drive.

14. The laundry appliance clutch as claimed in claim 11, wherein
the at least one second locking element rotationally couples the driven member and the driving member together during acceleration or constant speed following acceleration of the driving member in the second rotational direction when the at least one second locking element is in the second locking position, and
the at least one first locking element rotationally couples the driven member and the driving member together during deceleration or constant speed following deceleration of the driving member in the second rotational direction when the at least one first locking element is in the first locking position,
the at least one first locking element and first locking position being located on a first level, and the at least one second locking element and second locking position being located on a second level so that the at least one first locking element cannot assume the second locking position and the at least one second locking element cannot assume the first locking position.

15. The laundry appliance clutch as claimed in claim 11, wherein the first rotational speed of said driving member or driven member and the second rotational speed of said driving member or driven member are rotational speeds in the first direction of rotation of the driving member or the driven member and the second rotational speed is greater than the first rotational speed.

16. The laundry appliance clutch as claimed in claim 12, wherein the at least one first pocket is directional having an abutment side and a ramped side, and when the first locking element enters a said first pocket the first locking element rotationally couples the driving and driven members together when accelerating in the first rotational direction or at a constant speed following acceleration in the first rotational direction, the first locking element being captured between the abutment side of the first pocket and a side of the first channel facing the abutment side, and the at least one second pocket is directional having an abutment side and a ramped side, and when the second locking element enters a said second pocket the second locking element rotationally couples the driving and driven members together when decelerating in the first rotational direction or at a constant speed following deceleration in the first rotational direction, the second locking element being captured between the abutment side of the second pocket and a side of the second channel facing the abutment side.

17. The laundry appliance clutch as claimed in claim 12, wherein when the at least one first locking element is in the outer radial position and the at least one second locking element is in the outer radial position and the driven member and the driving member are accelerating or at constant speed following acceleration in the first rotational direction, said at least one first locking element is captured between said driven member and said driving member to rotationally couple said driven member and said driving member together, and said at least one second locking element is not captured between said driven member and said driving member.

18. The laundry appliance clutch as claimed in claim 12, wherein when the clutch speed changes from acceleration or constant speed following acceleration in the first rotational direction to deceleration in the first rotational direction, the at least one first locking element is released from between the driven and driving members and the at least one second locking element is captured between the driven and driving members, and once released the first locking element is free to move away from the outer radial position once the rotational speed of the clutch decreases below the first rotational speed.

19. The laundry appliance clutch as claimed in claim 14, the driven member having at least one first channel extending from an inner radial position to an outer radial position, a said first locking element being disposed in a said first channel, the first locking position being at the outer radial position of the first channel, the driven member having at least one first pocket, the first channel having a ramped surface which is inclined at a first angle from the inner radial position to the outer radial position to gravitationally bias the first locking element to the inner radial position, the first locking element moving from the inner radial position to the outer radial position under centrifugal force to enter a said first pocket at the outer radial position when said first pocket is radially aligned with said first channel when speed of the driven member accelerates to a speed above the first rotational speed, and the driven member having at least one second channel extending from an inner radial position to an outer radial position, a said second locking element being disposed in a said second channel, the second locking position being at the outer radial position of the second channel, the driven member having at least one second pocket, the second channel having a ramped surface which is inclined at a second angle from the inner radial position to the outer radial position to gravitationally bias the second locking element to the inner radial position, the second locking element moving from the inner radial position to the outer radial position under centrifugal force to enter a said second pocket at the outer radial position when said second pocket is radially aligned with said second channel when speed of the driven member accelerates to a speed above the second rotational speed.

20. The laundry appliance clutch as claimed in claim 19, wherein the at least one first pocket is directional having an abutment side and a ramped side, and when the first locking element enters a said first pocket the first locking element rotationally couples the driving and driven sides together when accelerating in the first direction or at a constant speed following acceleration in the first direction, the first locking element being captured between the abutment side of the first pocket and a side of the first channel facing the abutment side, and the at least one second pocket is directional having an abutment side and a ramped side, and when the second locking element enters a said second pocket the second locking element rotationally couples the driving and driven sides together when decelerating in the first direction or at a constant speed following deceleration in the first direction, the second locking element being captured between the abutment side of the second pocket and a side of the second channel facing the abutment side.

21. The laundry appliance clutch as claimed in claim 19, wherein when the at least one first locking element is in the outer radial position and the at least one second locking element is in the outer radial position and the driven member and the driving member are accelerating or at constant speed following acceleration in the first rotational direction, said at least one first locking element is captured between said driven member and said driving member to rotationally couple said driven member and said driven member together, and said at least one second locking element is not captured between said driven member and said driving member.

* * * * *